Sept. 18, 1956 J. C. URBAN ET AL 2,763,182
SEMI-AUTOMATIC MULTIPLE IMAGE PLACEMENT CAMERA
Filed Dec. 7, 1953 7 Sheets-Sheet 1

INVENTOR.
JOHN A. HARVEY, JR.
BY JULIUS C. URBAN

ATTORNEY

Sept. 18, 1956    J. C. URBAN ET AL    2,763,182
SEMI-AUTOMATIC MULTIPLE IMAGE PLACEMENT CAMERA
Filed Dec. 7, 1953    7 Sheets-Sheet 2
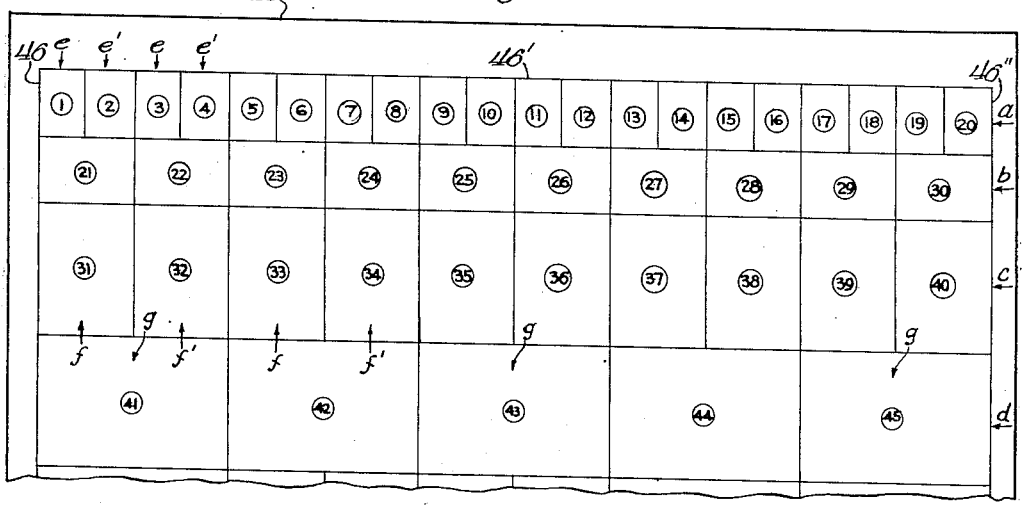
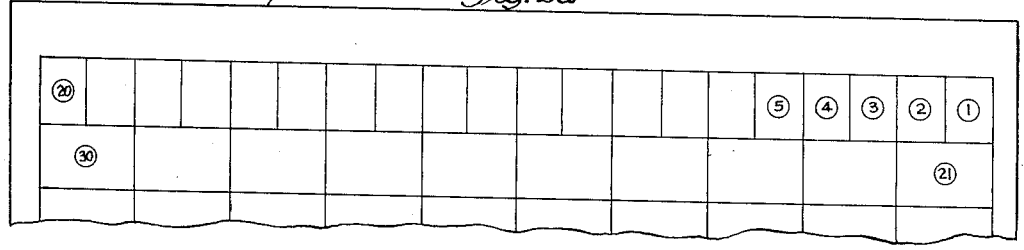
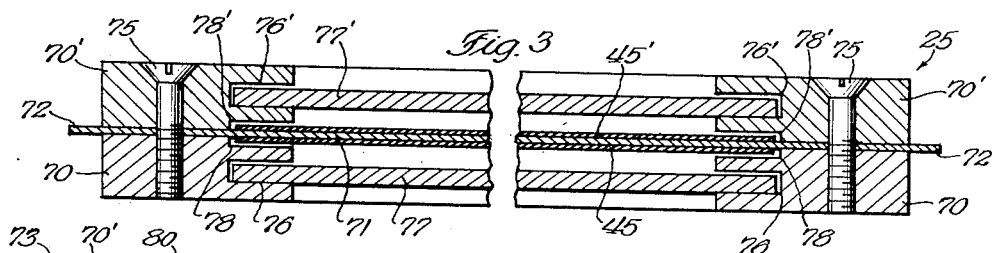
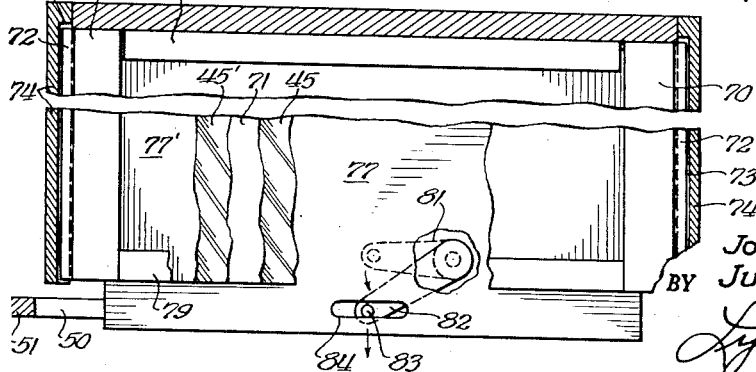
INVENTOR.
JOHN A. HARVEY, JR.
BY JULIUS C. URBAN
*Lynn Latta*
ATTORNEY

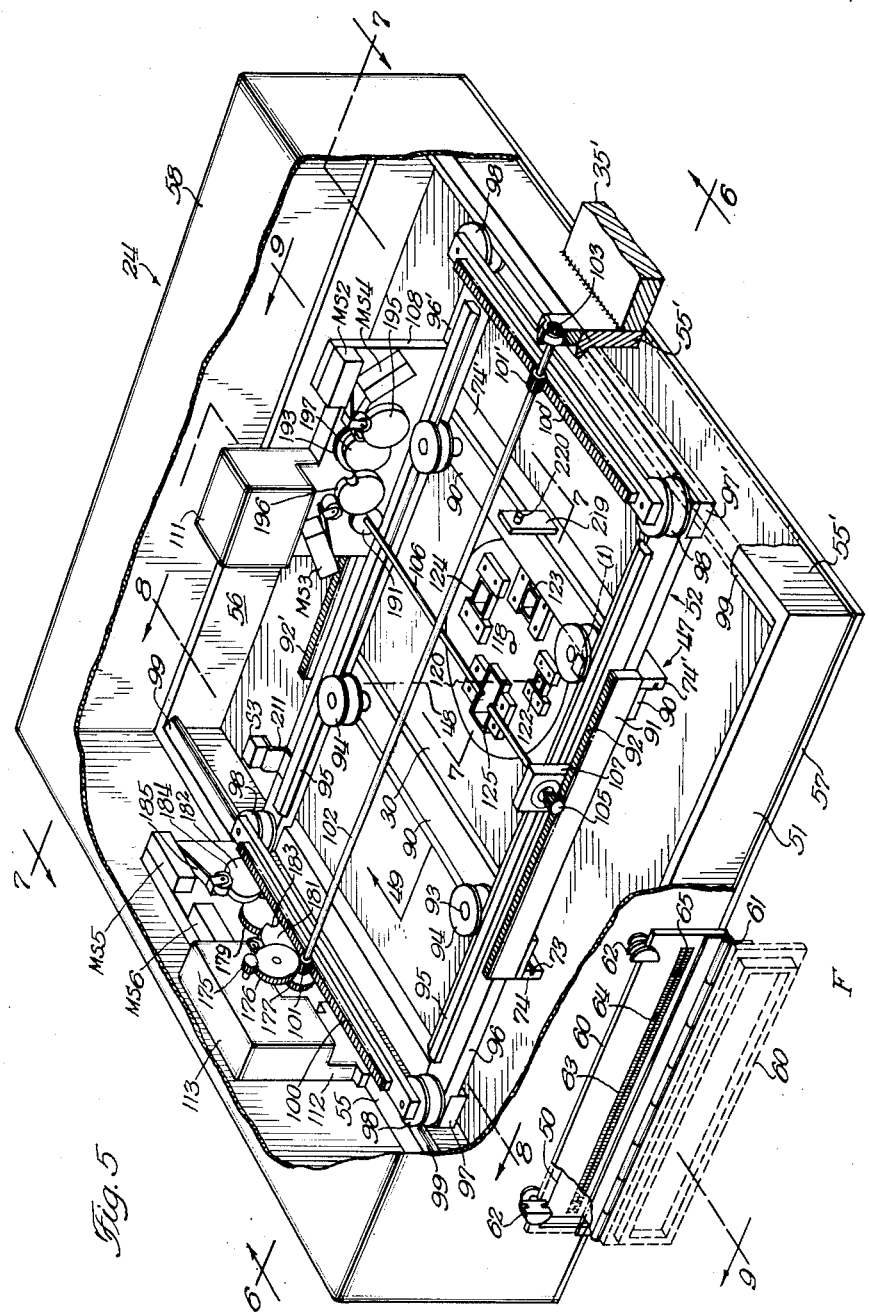

Sept. 18, 1956 J. C. URBAN ET AL 2,763,182
SEMI-AUTOMATIC MULTIPLE IMAGE PLACEMENT CAMERA
Filed Dec. 7, 1953 7 Sheets-Sheet 4
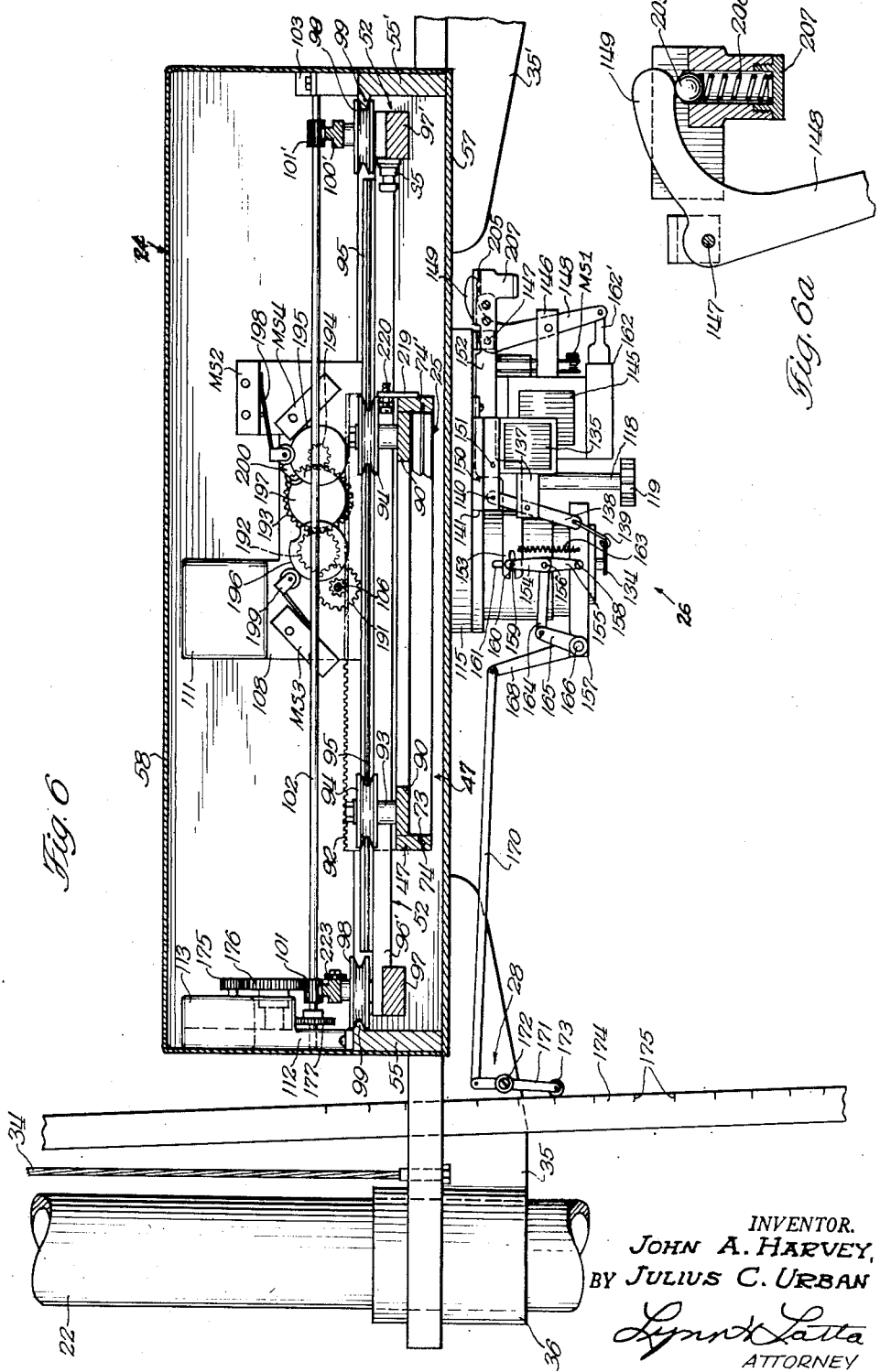
INVENTOR.
JOHN A. HARVEY, Jr.
BY JULIUS C. URBAN
Lynn Latta
ATTORNEY

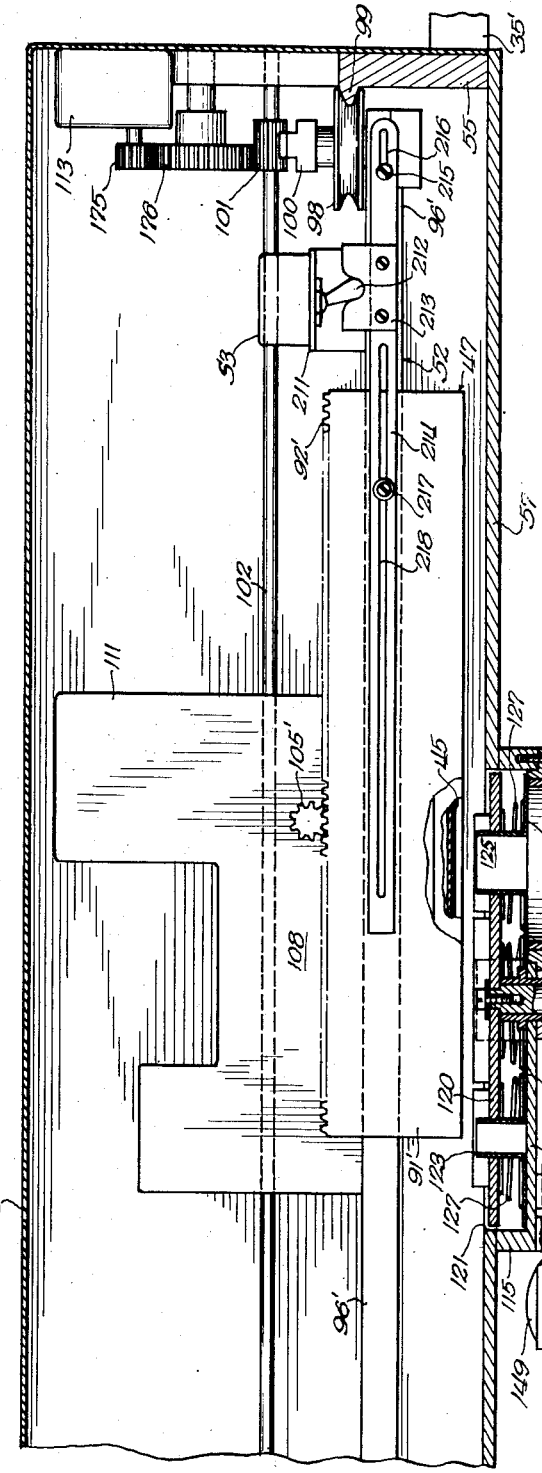

Sept. 18, 1956    J. C. URBAN ET AL    2,763,182
SEMI-AUTOMATIC MULTIPLE IMAGE PLACEMENT CAMERA
Filed Dec. 7, 1953    7 Sheets-Sheet 6
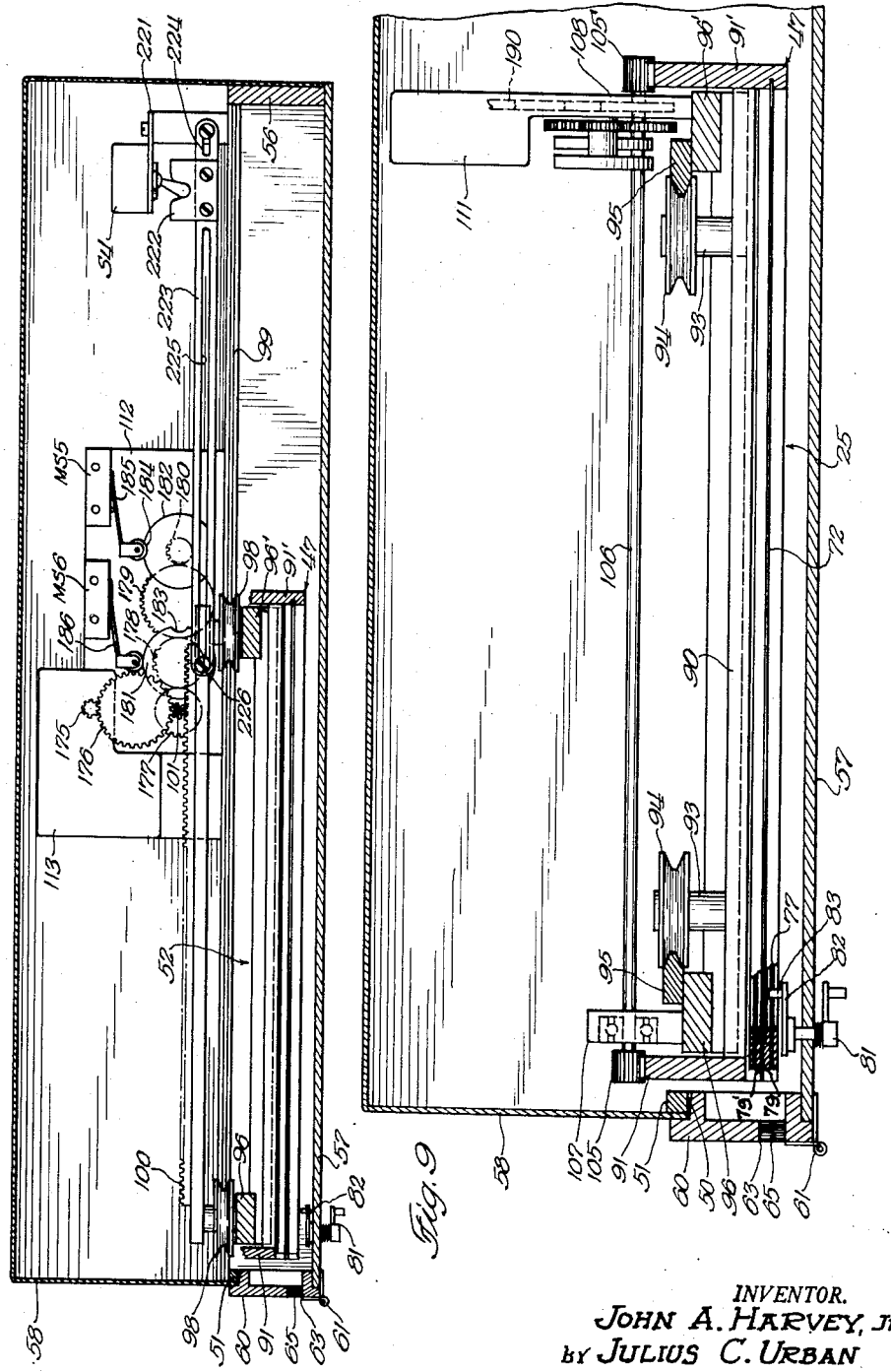
INVENTOR.
JOHN A. HARVEY, JR.
BY JULIUS C. URBAN
ATTORNEY Sept. 18, 1956  J. C. URBAN ET AL  2,763,182
SEMI-AUTOMATIC MULTIPLE IMAGE PLACEMENT CAMERA
Filed Dec. 7, 1953  7 Sheets-Sheet 7

INVENTOR.
JOHN A. HARVEY, JR.
BY JULIUS C. URBAN

ATTORNEY

United States Patent Office 2,763,182
Patented Sept. 18, 1956

2,763,182

SEMI-AUTOMATIC MULTIPLE IMAGE PLACEMENT CAMERA

Julius C. Urban, Los Angeles, and John A. Harvey, Jr., Santa Ana, Calif., assignors to Records Service Corporation, a corporation of California Application December 7, 1953, Serial No. 396,372

24 Claims. (Cl. 88—24)

This invention relates to micro-photo reproduction of documents and the like, and has as its general object to provide an improved apparatus whereby a plurality of small images may be recorded photographically in a regular geometric sequence upon a rectangular sheet of film or print paper adapted for vertical filing.

The current practice in the recording, filing and reading of images on micro-film, entails the use of ribbon film with a linear series of images thereon, following generally the well developed motion picture practice. Where a large number of images are recorded, the film must necessarily be of considerable length and the common practice of rolling it upon reels or into rolls, is resorted to as the only feasible method of handling the film. Such practice has various disadvantages, including difficulty in handling and storing the film and locating the particular subject to which reference is desired. The use of micro-film by libraries, banks, title and abstract companies, brokerage offices, Government departments, etc., for recording images of various items such as rare books, cancelled checks, legal papers, public records, etc., makes of great importance the matter of attaining facility and ragidity in locating selected subjects on the film. Because of the disadvantages of roll film, a decided need for improved methods and apparatus for recording images on cards or sheets which can be filed vertically, has now become apparent and pressing.

Realizing this need, efforts have already been made to assemble micro-images upon rectangular sheets, cards, etc., for vertical filing. Such efforts have, in the main, resorted to the conventional method of recording a series of images in a single row on ribbon film, cutting the film into sections of various lengths, and mounting one or more of such sections upon cards (e. g. three inches by five inches cards) or upon larger sheets of paper or transparent film, either in single rows or in a series of rows arranged in parallel adjacency. Record cards or sheets thus constructed however, fall short of being fully satisfactory since the adhesive usually warps the card or sheet of paper or clear film upon which the strips of images have been mounted. An improvement in the end result has been obtained by rephotographing the series of image strips upon a fresh sheet of film, but this has the disadvantage common to the previously mentioned methods, of requiring additional processing steps subsequent to the original photographing procedure. It has the further disadvantage of losing some of the sharpness of the original image in the second stage of photographing.

In order to assemble a maximum number of images on a rectangular record sheet, it is desirable that the images be aligned both in horizontal rows and vertical columns. In this manner, substantially the entire area of a record sheet may be covered with a succession of images.

With the foregoing in mind, the primary object of this invention is to provide an apparatus by means of which a rectangular sheet of film or print paper may be repeatedly exposed in a sequential stepping operation in which a plurality of lines of images, with each line containing a plurality of images, may be successively recorded in adjoining, parallel sequence until the entire usable area (or any selected portion thereof) of the record sheet is covered with the images.

In general, the invention contemplates a camera apparatus having means for supporting and moving a sheet of photographic film in a plurality of directions in a sequence such that the film may be caused to traverse the "camera eye" (lens aperture) through which the image forming light rays are brought to the film, with a series of stepping movements in each traverse, whereby a line of successive images is recorded; with a return and indexing action in which the film is returned to the traverse starting position and is shifted one step in a direction at right angles to the traverse movement, so as to start a new line of images; and with succeeding return and indexing movements such as to eventually traverse the entire area of the film sheet past the camera eye.

A further object is to provide a camera apparatus whereby each traversing step may be initiated manually with a stop after each succeeding step, so as to enable the operator to replace a photographed document by a fresh document before the next step is initiated, whereby each successive image may be that of a different document or item.

Another object is to provide a camera apparatus whereby the progression from one step to another may take place automatically in response to a simple manual control element such as a push button, repeatedly actuated, with a new traverse step following in response to each new actuation of the button or other control device; and with the return traverse and line-shifting index operations likewise occurring automatically in response to a new actuation of the control device at the end of each traverse.

A further object is to provide such a camera apparatus wherein the return traverse will continue, in a single operation, for the full length of one line of images, so as to return the film to a starting position for a subsequent line of images without requiring more than a single actuation of the control device.

In addition to the foregoing objects, the invention aims to protvide for recording images of a plurality of sizes. Specifically, the invention aims to provide a camera which may be used for recording images in a plurality of sizes constituting several multiples of a unit area or minimum size (e. g. in sizes including not only the unit or minimum size but also areas equivalent to twice, four times or even eight times the unit area). A further object is to provide a camera having means whereby the changeover from one image size to another is a function of the regular operation of the apparatus and may be easily and quickly accomplished by the operation of simple control devices, and without requiring any re-arrangement of the parts of the apparatus.

To thus provide for recording images of different sizes, raises a new problem, i. e. that of registering the lens axis with the center of the area to be photographed. The center of a double unit image area, for example, will occur at one margin of a single unit area, and the center of a quadruple unit image area will occur in a still different location. Another problem, inherent in the provision for images of various sizes, is that of varying the intervals of stepping movement of the film holder in its traverse past the camera eye. For example, half as many stepping movements are required to traverse a line of double unit image areas past the camera eye as are required to traverse a line of single unit areas past the camera eye, where the double unit areas are attained by utilizing two unit areas side by side along the length of a row if images. Likewise, where an image area is doubled along the vertical dimension of the sheet, the vertical indexing step must be twice the dimension of the unit indexing step. To provide for shifting the film holder in horizontal traversing steps and vertical indexing steps, both of varying lengths, and at the same time to provide for centering the image areas of varying sizes with respect to the lens axis in all cases, without resorting to an extremely complex mechanism, would appear to be an almost insurmountable problem. However, we have discovered how to utilize a common mechanism for attaining both of these results, i. e., for regulating the horizontal stepping and vertical indexing intervals, and at the same time for stopping the film holder, at the end of each stepping movement, at exactly the right spot to center the selected image area at the lens axis, and to attain automatic correlation of both of these functions in response to a simple selector control device which may be of a "dial" type; and a further object of our invention is to attain this in a mechanism of relatively slight complexity and yet of fully dependable operation.

The repeated exposure of a sheet of light sensitive film to produce thereon a succession of images "packed" together in immediate adjacency in both horizontal lines and vertical columns, raises another serious problem, i. e., that of confining each exposure to the relatively small area of the single image being recorded, without simultaneously exposing or fogging surrounding areas of the film. To solve this problem, the invention utilizes an image framing mask extending from the lens to the emulsion coated surface of the film, together with a light excluding casing surrounding the film and film holder. To maintain such an image-framing mask in continuous contact with the emulsion surface would, however, result in scratches in the emulsion during the shifting of the film holder from one position to another. With this problem in mind, a further object of the invention is to provide a camera having means for automatically advancing a mask into contact with the film so as to frame the exact image area to be exposed, as an operation immediately preceding the opening of the camera shutter, and for thereafter withdrawing the mask out of contact with the film preparatory to the shifting of the film holder to a new position.

A further object of the invention is to provide a camera having a series of image framing masks of varying sizes corresponding to the several image areas for which the camera may be operated, together with relatively simple means for mounting said masks for selective positioning between the lens and the film holder.

A further object is to provide such a camera apparatus including operating mechanism adapted, in response to a single actuation of a control element, to automatically present the image framing mask to the film; to then trip the shutter so as to expose the framed image area; to then withdraw the mask away from contact with the film; and to subsequently initiate one step of movement of the film holder so as to bring an adjacent image area into register with the lens axis.

Where subjects of the same size are to be reproduced in images of varying sizes, it is necessary to adjust the distance between the lens and film holder on the one hand and the subject on the other hand. To this end, the invention further contemplates camera apparatus including a bed upon which documents and other subjects may be supported or secured, together with a camera head, including the lens, shutter, holder and traverse mechanism, all of which is adapted to be adjusted as a unit toward and away from the bed. Along with such adjustment, however, there must be an adjustment of focus. To this end, the invention has as a further object to provide a means for automatically focusing the camera for any position of adjustment of the camera head with relation to the subject bed.

The invention contemplates a normal operation wherein a sheet of maximum size (e. g. "letter size," or 8½" x 11") has the entire usable area thereof covered by images. However, there may be many instances where it may be desirable to use the camera for recording a smaller number of images on a smaller sheet (e. g. of card size). Accordingly, a further object is to provide a camera such as that outlined above which, however, is not necessarily restricted to a sequence of operations in which an entire maximum size sheet is covered with images, but which on the contrary may be selectively employed for recording a smaller group of images upon a smaller overall area. To this end, the invention contemplates, in addition to the normal stepping control for recording successive adjacent images, a supplementary control whereby the film holder may be caused to traverse a portion of its total traverse path, and also to selectively index vertically, without stopping to record images on the film.

The invention further deals with the problem of inserting unexposed film and removing exposed film from the camera head while shielding the film from all light rays. A further object of the invention is to provide a camera such as that outlined above, having means whereby a film holder with film therein protected by a dark slide, may be inserted into the camera head; the dark slide then removed through the light shielded slit; and the film holder subsequently carried through a complete cycle of traversing operations and thereafter returned to a position from which it may be removed from the camera head after the dark slide has been reinserted.

Other objects will become apparent in the ensuing specifications and appended drawings in which:

Fig. 2 is a layout diagram for a record sheet (as viewed in a "reader" apparatus) illustrating image areas of varying sizes and arrangements thereon;

Fig. 2a is a fragmentary view of the same film area with the images in the actual order as the film is viewed from above in the camera directly without the aid of a reader;

Fig. 3 is a fragmentary enlarged transverse sectional view of the film holder with film therein;

Fig. 4 is a fragmentary sectional view through the forward portion of the camera head and film holder carriage, in a horizontal plane immediately above the film holder, showing the latter in plan and partially broken away;

Fig. 5 is a perspective view of the camera head with portions of the casing broken away to illustrate the traversing mechanism therein;

Fig. 6 is a front elevation of the lens unit and adjacent parts, with the camera head casing and a portion of the traverse mechanism shown in vertical section in a plane approximately as indicated by the line 6—6 of Fig. 5;

Fig. 6a is a fragmentary sectional view of the over travel connection in the solenoid linkage;

Fig. 7 is a transverse vertical sectional view through the camera head and lens assembly, viewed in different planes, as indicated generally by the line 7—7 of Fig. 5;

Fig. 7a is a detail sectional view of the lens barrel;

Fig. 8 is a fore-aft vertical sectional view of the camera head taken on the line 8—8 of Fig. 5;

Fig. 9 is a fore-aft vertical sectional view of a portion of the camera head, taken on the line 9—9 of Fig. 5.

GENERAL FEATURES—FIG. 1

Figure 1:
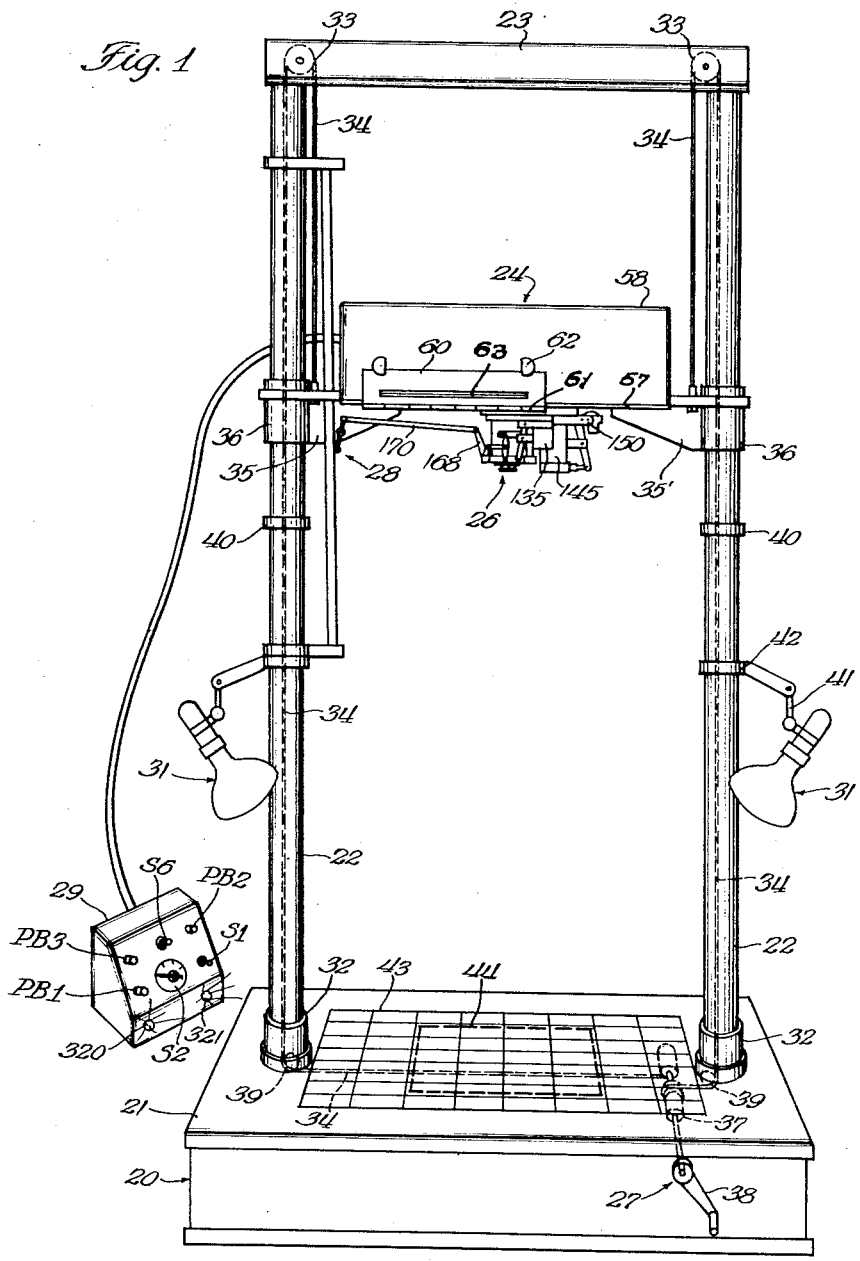
Fig. 1 is a perspective front elevational view of a camera apparatus embodying our invention.

Referring now to Fig. 1, there is shown therein, as an example of one form in which the invention may be embodied, a microcopy camera apparatus including a base 20 having, as a top member thereof, a bed 21 providing a smooth flat surface for supporting a document or other subject to be photographed. A pair of standards 22 mounted in and rising from base 21, are bridged at their upper ends by a girder 23. A camera head 24, slidably mounted between standards 22, contains a film holder 25 (Fig. 6) and traverse mechanism including a carriage 47 for the holder 25. To accommodate the line traversing movements of the film holder, carriage 47 is mounted upon an intermediate carriage 52 (Fig. 5) for movements laterally of the camera head; and to accommodate the indexing movements of the film holder in the direction of the vertical axis of the film sheet, intermediate carriage 52 is mounted in camera head 24 for fore-aft movements, as will be more fully described hereinafter.

A shutter unit 26 is carried at the under side of camera head 24. Means 27 is provided for raising and lowering the head 24 on the standards 22. Automatic focusing apparatus is indicated generally at 28; a control box at 29; and a pair of illuminating units at 31, arranged to direct their rays downwardly upon the document or item supported upon bed 21.

The standards 22 may be of tubing, secured to bed 21 by fittings 32. Girder 23 may consist in an angle iron having a horizontal flange secured to the upper ends of standards 22 and a vertical flange projecting upwardly therefrom. Pivotally mounted upon this vertical flange are a pair of pulleys 33, around which are trained cables 34 projecting through apertures in the horizontal flange of girder 23 and secured at their one ends to respective camera head supporting brackets 35, 35'. Brackets 35, 35' include sleeve bearings 36 slidably encircling standards 22. Elevating device 27 includes a windless 37 journalled in base 20 and having a crank 38 at its forward end, for rotating the same. The other end of each cable 34 is wound upon a respective end portion of windlass 37 in such a manner that rotation thereof in one direction will result in raising the head 24 whereas rotation in the opposite direction will allow the head 24 to move downwardly by gravity. Cables 34 are trained around pulleys 39 in base 20 and thence extend upwardly through tubular standards 22 to pulleys 33. Downward limits of movement of head 24 may be determined by collars 40 attached to standards 22, constituted abutments for engagement by bearing sleeves 36.

Illuminating units 31 may consist in conventional electric lamps connected by adjustable elbow linkages 41 to brackets 42 supported upon standards 22 below collars 40.

IMAGE ARRANGEMENT ON RECORD SHEET—FIGS. 2–3

Fig. 2 illustrates a possible arrangement (as viewed in a reader," i. e., an apparatus in which the micro-dimension images are enlarged to proportions such as to be easily readable) of images of varying sizes upon a record sheet (e. g. an 8½" x 11" flat film) indicated generally by the numeral 45. This figure indicates that all of the usable area of the sheet, within the margins indicated at 46, 46', 46" may be blanketed by a succession of images in immediately adjoining relationship. The images are arranged in horizontal "rows" or "lines" a, b, c, d, etc., of which lines a and b are unit height lines and lines c and d are double unit height lines. The images may also be arranged in vertical columns e, e' for unit width images, columns f, f' for double width images, and columns g for quadruple width images.

The respective image areas are numbered consecutively by numerals each enclosed in a circle to distinguish them from numerals appearing on other figures of the drawing. Such numbering indicates the order in which the images may be viewed in a reader, the progression being from left to right in each horizontal line of images and from top to bottom in the shifting from one line to another, as in the reading of a printed page. Since this is the most natural sequence for use in reading a series of images on a record sheet, one of the objects of the invention is to provide an apparatus which will record the images in a sequence such that, when the sheet is viewed in a reader the arrangement of images will be such as to provide for reading in a sequence corresponding to that of reading a printed page.

Fig. 2 illustrates the virtual image arrangement as it would appear in the reader apparatus if such a large portion of the record sheet could thus be viewed. However, the magnification is not illustrated, the dimension corresponding to the actual micro-dimensions of the record sheet. Moreover, each individual image of Fig. 2 would appear the same as on the original subject (except for the reduction in size). Fig. 2a illustrates the actual image arrangement as it wolud appear on the record sheet, in the camera, as viewed from below by the camera eye, the images being reversed, right and left. If the film could be viewed from above while in the camera, the images would appear reversed both right and left and vertically, the (1) image appearing at the lower right hand corner in the image on the actual film, whereas it appears in the upper left hand corner in the image seen in the reader, owing to the optical reversal which is effected by the reader lens system. It will now be apparent that the (1) image on the film in the camera, as viewed from above, will be located at the lower right hand corner of the film sheet.

Referring now to Fig. 5, the film may be visualized as being supported by film holder 25 (not disclosed in this view) immediately below a rectangular opening 30 in the travelling film holder carriage 47. The front side of the camera head 24 is indicated by the letter F. The lower right hand corner location of the number 1 image on the film is indicated by the numeral (1). The axis of the camera eye is indicated by the broken line 48. To expose the (1) image, the lower right hand corner of the film must be positioned at the camera axis 48.

In order to position the lower right hand corner of the film at the camera eye axis 48, the frame 47 must be shifted leftwardly and rearwardly as indicated by the bent arrow 49 of Fig. 5. This will bring the film holder frame 25 to a starting position. The frame 47 is shifted forwardly from such starting position to bring the holder frame 25 to a loading position in which it registers with a slot 50 in the forward frame member 51 of camera unit 24, whereby the film holder may be inserted into the camera head 24 and removed therefrom.

Referring back to Fig. 2, the image areas designated by circled numerals (1) to (20) inclusive are single unit areas, i. e. for images of minimum size. The image areas designated by numerals (21) to (30) inclusive are double unit areas. For example, if the unit area is taken as a 16 mm. single frame (⅜ x 1½ inches), the double area 21 etc., will correspond to what is known as double frame 16 mm. (¾ x ½ inches). The double frame areas have the same vertical dimension as the unit areas but are twice as wide. The areas designated by numerals 31 to 40 inclusive are quadruple the unit area and correspond to what is commonly known as single frame 35 mm. (¾ x 1 inch). These single frame 35 mm. areas are of the same horizontal dimension as the double frame 16 mm. areas but have twice the vertical dimension. The areas indicated by numerals 41 to 45 inclusive correspond to what are known as double frame 35 mm. (1½" x 1") and are eight times the unit area. These areas have the same vertical dimension as the single frame 35 mm. areas but are twice as wide.

For the unit size image, the camera axis must pass through the center of the circle surrounding the numeral 1. In this connection it may be noted that the circle surrounding each of the numerals shown in Fig. 2 indicates the center of the respective image area.

It may now be noted that the center of a double unit area, e. g. area (21) is displaced horizontally from the vertical axis of the center of the unit area, occurring at the side margin of a unit area, i. e. the dividing line between adjacent unit areas. The vertical positioning of the centers of the single unit and double unit areas, with reference to the horizontal margins thereof are the same. As to the quadruple unit area, e. g. area (31) the center of this area is positioned horizontally with the same marginal spacing as the center of the double unit area, but its vertical positioning with reference to its horizontal margins is different from that of the single unit and double unit areas. The center of the largest area e. g. area (41) has a vertical positioning between its horizontal margins corresponding to that of the quadruple unit area (31) but its horizontal positioning is different from that of the single unit or the double unit area. Horizontally, it is aligned with the margin of a double or quadruple unit, i. e. a dividing line between two adjacent units of that class.

From the foregoing it will be apparent that, as measured from the left margin 46 of the image field, the distance to the center of the largest area, e. g. area (41) is twice the distance of the center of a quadruple unit area (31) or double unit area (21) from the margin 46, and four times the distance of the center of a single unit area from the margin 46. As will hereinafter appear, the invention provides for automatic adjustment of the film holder carriage 47 at the beginning of each horizontal line of images, to the proper distance from a leftward limit of movement, and indexing of the holder in the direction of the vertical axis of the film sheet, away from the position it would occupy for any line of single unit images, such as to properly center the image area that is to be exposed with reference to the camera eye axis 48, regardless of size of such image area.

CAMERA HEAD CASING—FIGS. 5, 8, 9

The camera head 24 includes a rectangular frame embodying four members disposed in vertical planes at the four sides of the head, i. e., front member 51, side members 55, 55', and a rear member 56. Supporting brackets 35, 35' are suitably attached to side members 55, 55' as indicated in Fig. 1, for securely supporting the camera head in a horizontal plane. Secured to the under sides of frame members 51, 55, 55', 56 is a flat bottom 57 which projects slightly beyond the frame members to define a flange. A light shielding hood 58 has side walls adapted to embrace the outer faces of the frame members with a sufficiently snug fit to provide in combination with the frame and bottom 57, a light excluding casing in which the operating mechanism is contained. The hood 58 may be lifted from the frame when access to the operating mechanism is called for. It is suitably notched to receive brackets 35, 35'.

The previously mentioned access slot 50 extends through the front wall of hood 58 and through front frame member 51. It is normally closed by a closure plate 60 which is hinged to bottom 57 by a piano hinge 61 whereby it may be dropped downwardly to the position indicated in dotted lines in Fig. 5, so as to uncover slot 50 and allow the insertion and removal of the film holder. Latch buttons 62 are provided for securing the closure plate 60 in light sealing contact with the forward wall of hood 58. Closure plate 60 has a longitudinal slot 63, somewhat narrower than slot 50 but registering therewith, slot 63 being normally closed by a light trap comprising felt lips 64 which between them define a normally closed slit 65 for passage of the dark slides hereinafter referred to.

FILM HOLDER—FIGS. 3, 4

Referring now to Fig. 3, it discloses a cross sectional view of the film holder, which comprises parallel pairs of lateral frame members 70, 70', joined by a central partition plate 71 the lateral margins of which project to form flanges 72. Flanges 72 are slidably mounted in track grooves 73 in slideways 74, 74' (Fig. 5) constituting lateral marginal parts of film holder carriage 47. Lateral frame members 70, 70' are suitably secured to plate 72 as by screws 75.

Defined in the inner margins of frame members 70, 70' are slideway grooves slots 76, 76', for receiving dark slides 77, 77'. Defined between frame members 70 and partition plate 72 are inner grooves 78, 78', adapted to receive the lateral margins of film sheets 45, 45'. It will now be apparent that the film holder is a double unit, with duplicate dark slides and adapted to hold duplicate films, whereby the holder may simply be removed from the camera head, turned over and reinserted for exposing a second sheet of film, without taking it to the dark room.

When the carriage 47 has been indexed to a loading position (in which it lies immediately behind the access slot 50, in the forward left hand corner of the camera casing) it becomes possible by opening closure plate 60 to insert and remove the film holder through slot 50 directly into or out of the carriage 47. The margins of slot 50 are so disposed as to guide the film holder so that flanges 72 will enter track grooves 73 as the holder is being inserted into the camera head. Also, while the carriage 47 is in this loading position, and after the film holder has been inserted into carriage 47, the underneath dark slide 77 may be slid forwardly through the light trap slit 65 and removed from the camera head so as to expose the lower film sheet 45 by the rays of light passing through the camera eye when the shutter is open.

For effecting the withdrawal of the lower dark slide 77, we provide an actuator implement which is shown in Figs. 4, 8, and 9. Such actuator implement comprises a crank 81 journalled in bottom plate 57 including on its upper end a finger 82, having an upwardly projecting pin 83 adapted to engage in a slot 84 in dark slide 77 and, by rotation of the finger in the direction indicated by the arrow in Fig. 4, to move the slide 77 forwardly through light trap slit 65 until the forward portion of the dark slide projects through the slot where it may be grasped between the finger tips, and thereupon withdrawn from the camera head.

The film holder includes, in addition to side members 70, forward transverse frame bars 79 (Figs. 4 and 9) which are rabbeted to match the grooves 78, 78', thus forming pockets to receive the forward ends of the film sheets 45, 45'. At the other end of the film holder, hold down strips 80 are hinged to the holder and may be lifted in order to provide for insertion and removal of the rear ends of the film therebeneath.

FILM HOLDER CARRIAGE AND INTERMEDIATE CARRIAGE—FIGS. 5, 6, 8, 9

Film holder carriage 47 includes the lateral ways 74 74' which project downwardly from horizontal side frame members 90 which are attached thereto and project inwardly therefrom at the upper margins thereof. Cross members 91, 91' extend between, are secured to, and connect in laterally spaced relation the respective ends of members 90, to define therewith a rectangular frame, framing the opening 30. Members 91, 91' constitute rack bars, having rack teeth 92, 92' in their upper margins. Rotatably mounted on posts 93, secured to and projecting upwardly from members 90, are flanged rollers 94, on which the carriage 47 is suspended for movement transversely of the camera head 24, upon rails 95.

Rails 95 are attached to longitudinal frame members 96, 96' of the intermediate carriage 52, members 96, 96' being connected by end members 97, 97' which extend parallel and adjacent to the respective side frame members 55, 55', to form a rectangular frame. Fore-aft travelling movement of carriage 52 is provided for by suspension thereof upon flanged rollers 98 which are rotatably mounted at the four corners of the frame. Flanged rollers 98 travel on rails 99 which are secured to and project inwardly from the upper margins of side frame members 55, 55'. Mounted upon end frame members 97, 97' and disposed above rollers 98 are rack bars 100, 100'.

For effecting movement of the film holder in the direction of the vertical axis of the film sheet, rack bars 100, 100' are engaged by pinions 101, 101' carried by a shaft 102 which is journalled in a motor mounting bracket 112 and in a bearing 103 on side frame members 55, 55' respectively. This provides for fore-aft movement of carriage 52, which carries with it the holder carriage 47 and the film holder in "vertical" (fore-aft) indexing movements. For effecting lateral movement of carriage 47 for line-traversing, rack teeth 92, 92' are engaged by pinions 105, 105' (Fig. 9) on the respective ends of a shaft 106 which is journalled in a bearing 107 and a motor mounting bracket 108 respectively, carried by the respective longitudinal frame members 96, 96' of the intermediate carriage 52.

Carried by bracket 108 and moving with intermediate carriage 47 is an electric motor 111 for actuating shaft 106. Carried by a motor bracket 112 mounted in a fixed position on the left side frame member 55, is a motor 113 for actuating shaft 102. The extent of actuation of shafts 102 and 106 for any step of operation is determined by mechanism which will be described hereinafter.

At this point it may be noted that, in carriage 47, frame member 74', 74 and 90 extend beneath the longitudinal frame members 96, 96' of the intermediate carriage 52, and that cross frame members 91 project upwardly from members 74, 90 to a level above the intermediate frame so that the operating mechanism may all be disposed above the plane of movement of the holder carriage 47.

LENS AND SHUTTER ASSEMBLY—FIGS. 5-7

Figs. 5-7 illustrate the lens and shutter assembly 26, which includes a turret type, selective, multiple image framing apparatus. Such apparatus includes a shallow cylindrical turret head 115 attached to the underside of bottom plate 57 and having a flat bottom 116 from the center of which there projects downwardly a tubular boss 117. Rotatably mounted in suitable bearing bushings in boss 117 is a turret operator stem 118 having a knob 119 at its lower end and having secured to its upper end, for rotation therewith, a turret 120 of flat disc form. Turret 120 is received in a circular opening 121 in bottom plate 57. Turret 120 has a series of rectangular apertures of differing sizes therein, in which are mounted, for vertical shifting movements, respective image framing masks 122, 123, 124 and 125 of rectangular tube form. Each of the masks 122—125 has at its lower end a radial flange 126 which normally rests against the bottom 116 of the turret head. A coil spring 127 is engaged under compression between each flange 126 and the under face of turret 120, to urge the respective image framing mask downwardly to a retracted position spaced away from the under film sheet 45, and withdrawn below the path of travel of holder carriage 47.

On one side area of the turret head bottom 116 is a circular opening which communicates with the upper end of a lens barrel mounting sleeve 128, secured to turret bottom 116. Mounted within sleeve 128 is an outer section 129 of a sectional, telescoping lens barrel which includes an inner section 130 slidably mounted within outer section 129.

Fixedly mounted within inner barrel section 130 are lens and shutter units 131, 132 respectively, the former having therein a lens 133, and the latter having conventional shutter mechanism which forms no part of the present invention and is therefore not illustrated. The shutter unit is provided with a crank 134 which projects therebelow. Crank 134 is actuated by a shutter solenoid 135 (Fig. 6) having an armature 137 which is pivoted to an intermediate portion of a swinging actuator lever 138. A link 139 is pivotally connected to the lower end of lever 138 and to the outer end of shutter crank 134, for transmitting actuating movement from lever 138 to crank 134. The upper end of lever 138 is pivotally fulcrumed at 140 to a downwardly projecting boss 141 on turret head 115. When solenoid 135 is energized, armature 137 draws lever 138 rightwardly as viewed in Fig. 6, to the shutter trip position which is shown in that Figure. A suitable return spring (not shown) may act upon armature 137 to return it and the crank 134 to a starting position from which the shutter may again be tripped.

The lens barrel 129, 130 is bodily slidable in sleeve 128 so as to cause the upper end of outer barrel section 129 to engage flange 126 and shift upwardly, into contact with the under side of film 45, that image framing unit 122, 123, 124 or 125 which is disposed above the lens assembly. This operation takes place prior to the tripping of the shutter, so that, when the shutter is tripped, the lens unit will be in a raised position, the image framing mask will be pressed against the film to exclude the light rays from the entire area of the film except the image area to be immediately exposed. In this position, the lens will be at the proper distance from the film for the particular exposure that is to be made. This distance may be adjusted, as will be pointed out shortly hereinafter.

The mechanism for raising the lens assembly includes a solenoid 145 (Fig. 6); an armature 146 slidably associated therewith; a bell crank lever pivoted to turret head 115 at 147, having a downwardly extending arm 148 pivoted to the outer end of armature 146, and having a horizontally projecting finger 149; and a rocker bar 150 pivotally fulcrumed at 151 to boss 141 of turret head 115, the rocker bar 150 having an arm 152 the outer end of which is adapted to be engaged and moved by downward movement of finger 149, and having another arm 153 which is connected to inner barrel section 130 by means of pushpull toggle linkage including links 154, 155.

Links 154, 155 are joined by a pivot 156. At its lower end inner barrel section 130 has a rim 157 to which lower link 155 is connected by a pivot 158.

To cushion the action of solenoid 145, there is provided a dash pot including a cylinder 162 attached to the under side of the solenoid and a plunger 162' operating therein and pivotally connected to the lower end of arm 148.

Before proceeding further, it may be noted that energization of solenoid 145 will draw armature 146 inwardly, causing finger 149 of bell crank lever 148, 149 to move downwardly, depressing the arm 152 or rocker bar 150 and correspondingly raising the arm 153 thereof, thus transmitting elevating movement to the lens barrel assembly through the toggle linkage acting as a pull linkage.

AUTOMATIC FOCUSSING—FIGS. 6-7a

Upper link 154 is connected to outer lens barrel section 129 by means of a pin 159 (Fig. 7a) which extends through a horizontal slot 160 in lever arm 153, through a vertical slot 161 in mounting sleeve 128, and is fixed in outer barrel section 129. A coil spring 163, connected under tension between barrel rim 157 and lever 153 (the coil spring can be connected directly between pivots 158 and 159, but is shown displaced therefrom for clearer illustration in Fig. 6) functions to urge the barrel sections 129, 130 into closer telescoping association, but linkage 154, 155 maintains a degree of separation between barrel sections 129, 130, adjusted in relation to the vertical position of the camera head. Such adjustment is automatically effected through the medium of the focusing mechanism 28 which includes a link 164 (connected to pivot 156; a bell crank lever including an arm 165 pivoted to link 164, a stub shaft 166 journalled in the projecting portion of rim 157 (arm 165 being secured to shaft 166) an arm 168 secured to shaft 166 in a slot 169 (Fig. 7)

in the said projecting rim portion, a pull rod 170 pivotally connected to the upper end of arm 163, and a cam follower lever 171 which is fulcrummed on a pivot 172 carried by bracket 35. The upper end of lever 171 is pivoted to rod 170 and the lower end carries a roller 173 which rides on a straight cam rail 174, inclined downwardly and inwardly to function as a cam, and provided with inch marks 175 to indicate the height of the camera head from the bed 21. The roller 173 may serve as an indicator pointer which, when opposite a respective inch mark 175, will indicate accurately the height of the camera head as revealed by the numeral legend associated with the inch mark.

At this point, the automatic focusing operation may be reviewed. The proper focusing position of the lens is reached at the upper limit of elevation of the entire lens assembly, which is effected by the tilting movement of rocker bar 150 to bring one of the masks 122—125 (e. g. mask 122) into image framing engagement with the film 45. The exact position of the lens when the upward limit of movement of the lens assembly has been reached, will be determined by the position of adjustment between the lens holding inner barrel section 130 and the outer barrel section 129. Since the outer barrel section is directly connected to the arm 153 of rocker bar 150 through pin and slot connection 159, 160, its upper limit position is always the same, and it determines the position of the image framing mask by engagement with the flange 126 thereof. The lens position however is varied by varying the position of inner barrel section 130 relative to outer barrel section 129, this being effected by horizontal adjustment of focusing link 164 (received through linkage 165—173) which horizontal adjustment shifts the pivot 156 connecting links 154, 155 whereby, through toggle action of the links, the distance between pivots 158, 159 is varied. Thus, without affecting the limits of movement of the outer barrel section, the lens positions are varied by sliding the inner barrel section inside the outer barrel section.

MECHANSIM FOR TRAVERSING AND INDEXING OPERATIONS—FIGS. 5–9

Motor unit 113 embodies reduction gearing (not shown) which drives a pinion 175. Pinion 175 drives pinion 101 of shaft 102 through an idler gear 176 carried by motor bracket 112. Attached to shaft 102 behind pinion 101 is a gear 177 which forms a part of a gear train including gears 178, 179, and 180 (Fig. 8). To gears 178 and 180 are secured respective cams 181, 182 each having, at a single point in its circumference, a dwell recess (183 for cam 181; 184 for cam 182). Mounted on motor bracket 112 are two micro-switches MS5 and MS6 respectively. The actuator buttons of these switches are engaged by spring arms 185, 186 respectively, each secured at one end to a respective switch casing and at its other end carrying a roller, as shown, for engagement in a respective cam recess 184, 183. Switches MS5 and MS6 are of the self-closing type, closing when a respective cam follower roller drops into a respective recess 184 or 183 and opening when the roller lies high on the periphery of the respective cam to flex the respective arm 185 or 186 upwardly and press the actuator button thereof.

At this point, it should be mentioned that the electrical operation and control of the apparatus is based upon normally-energized motor circuits, and that the motor 113 (and motor 111 likewise) is a reversible motor of a type in which the energizing of both fields thereof establishes a bridge balance which blocks current flow in each, so that the motor is at rest; whereas, when either of the field circuits is opened, with the other field circuit remaining energized, current will flow in the latter and cause the motor to operate in the direction determined by the energized field.

Micro-switch MS5 functions as a limit switch to arrest the operation of motor 113 when a step of vertical indexing movement of unit height, i. e. the height of either a single or double image area—e. g. area (1) or area (21) has been covered in the indexing from one line of images to another. Micro-switch MS6 has a similar function when indexing a double unit height such as the height of a quadruple unit area or the maximum image area (e. g. area (31) or area (41) of Fig. 2). Since the latter indexing shift requires twice the movement for the unit shift, gears 180 and 178 are of relative diameters such as to establish a gear ratio of 1:2, whereby the cam 182 will be rotated twice as fast as cam 181. Accordingly, a double indexing movement will occur where the cut-off is controlled by cam 181 and micro-switch MS6, as compared to a unit indexing movement where the cut-off control is by cam 182 and micro-switch MS5.

It may now be noted that by selecting one of two alternate circuits, one leading through MS5 and the other leading through MS6, the vertical indexing function may be executed either with a unit indexing movement from one line to the next lower line, or with a double indexing movement from one line to a second succeeding line.

By means of a selector switch, which will be described hereinafter either of the micro-switches may be inserted into the circuit of one of the fields of motor 113 (the one which, when deenergized, cause the motor to operate in the direction for indexing the film holder toward the front F of camera head 24 so as to shift from one line of images to a "lower" line of images on the film sheet (e. g. from the line of images (1)—(2) to the line of images (21)—(30). The indexing shift of one line or two lines will then depend upon which of the micro-switches has been inserted into the circuit.

Motor unit 111 likewise includes an electric motor and a reduction gearing (indicated in broken lines at 190) (Fig. 9) which drives to the shaft 106. Shaft 106 drives a train of gearing including (Figs. 5 and 6) a gear 191 on shaft 106, a gear 192, a gear 193 and a gear 194, arranged in series in the order named. The diameters of gears 194, 192 and 193 are so related as to provide for them, in the order named, a ratio of 4:2:1. Attached to these gears are cams 195, 196, 197 respectively, each having a single dwell recess, as indicated, to receive the cam follower roller of a respective limit switch actuator arm 198, 199, 200 respectively, for actuating respective limit switches MS2, MS3, MS4. Due to the above mentioned gear ratio, MS2 will cut off the motor at the end of a single unit width step of traversing movement along a line of images (for a line of unit images such as (1), (2) etc.). MS3 will terminate at a double width traverse such as the double unit areas (21), (22) etc., or the quadruple unit areas (31), (32) etc. and MS4 will cut off at the end of a quadruple width traverse for one of the maximum image areas such as (41), (42) etc. It will now be apparent that the use of three limit switches in conjunction with motor 111 provides for the three different traverse widths, whereas the use of two limit switches in conjunction with motor 113 provides for the single and double vertical indexing shifts.

Micro-switches MS2 and MS4, like micro-switches MS5 and MS6, are self closing switches, are closed when the cam follower rollers of arms 198, 199, 200 are resting in their respective cam dwell recesses, and are open when a roller rides upon the periphery of a respective cam. As in the case of micro-switches MS5 and MS6, provision is made for inserting any one of the three micro-switches MS2, MS3 or MS4 into the circuit while the other two remain disconnected therefrom.

With any selected limit switch thus rendered operative, any step (or double step or quadruple step) of traversing movement may be initiated manually and will be terminated by the operation of the selected micro-switch.

SWITCH MECHANISM FOR SHUTTER RELEASE

Before proceeding with a discussion of the electrical circuits, several additional switches and associated parts will be referred to.

Shutter release is effected after solenoid 145 has operated to lift the lens barrel and associated image mask into proper photographing position. It is initiated by engagement of bell crank arm 148 (Fig. 6) against a flexing spring arm of a normally open micro-switch MS1 which may be carried by the frame of solenoid 145. In order that a full stroke of the image mask into full engagement with the film prior to exposure, may be assured, there is provided a yielding connection between bell crank 148, 149, and rocker bar 150, consisting in a ball 205 (Fig. 6a) engaged by the end of bell crank finger 149 and seated on a coil spring 206 which in turn is seated in a cup 207 carried by the end of rocker bar arm 152. This provides for over travel of bell crank 148, 149 past the point where the lens and image framing mask are in operative positions, and avoids the necessity for the observance of extremely close tolerances in correlating the point of engagement of the mask against the film and the point of closing micro-switch MS1. Furthermore, it assures accuracy in exact focussing of the lens for each "shot" since the lens position is uniformly determined by the contact of the mask with the film, which in turn determines a fixed position for the lens barrel, for any selected position of focussing adjustment.

SWITCH MECHANISM FOR AUTOMATIC RETURN FROM LINE TRAVERSE

Automatic return of the film holder to a line-beginning position at the end of a full line traverse, and forward indexing of the holder for a new line of pictures, is initiated by a reversing switch S3 which is a toggle switch (Fig. 7) mounted on a bracket 211 attached to rear intermediate frame member 96' and rearwardly overhanging the associated rack bar 92' of holder carriage 47. Switch S3 has an actuator lever 212 the lower end of which is engaged in a yoke 213 on an actuator bar 214. Bar 214 is supported, for limited longitudinal reciprocating movement, by a lost motion supporting connection with intermediate carriage 52, comprising a headed pin 215 extending through a slot 216 in one end of bar 214 and secured in member 96', together with a combined supporting and lost motion actuating connection with the rear side of rack bar 92', comprising a headed pin 217 extending through a slot 218 in the bar 214 and secured in rack bar 92'. Slot 218 is of such a length as to accommodate movement of holder carriage 47 to a point just short of a full traverse stroke thereof in either direction, at which point the engagement of pin 217 against bar 214 at the end of slot 218 shifts the bar 214 and yoke 213 so as to swing actuator lever 212 to an alternate position, reversing the toggle switch S3. Slot 216 accommodates such shifting movement of bar 214. Thus, at the end of a line of stepping traverse of carriage 47, in which a line of images has been recorded on the film, switch S3 is reversed with the result of reversing motor 111 for returning the carriage 47 to a line-beginning position. As will be explained more fully hereinafter, such return movement is unaffected by the step-limiting micro-switches MS2, MS3, MS4, and therefore proceeds uninterruptedly to the beginning of a new line.

SWITCH MECHANISM FOR AUTOMATIC CONTROL OF INDEXING CARRIAGE MOVEMENTS

Automatic indexing from one line of images to a succeeding line (vertical scanning) is effected at the completion of a line, by a contact switch S5 (Fig. 6) mounted on the inner side of rightward end frame member 97' of intermediate frame 52. An actuator finger 219, carried by frame member 74' of holder carriage 47, is adapted to engage the actuator button of S5 at the end of a horizontal traverse, thereby initiating the operation of motor 113 for vertical indexing of carriages 52 and 47 one or two lines, depending upon which of the limit switches MS5, MS6 is in control. S5 is a normally closed switch and is momentarily opened when contacted by the carriage, to start an indexing operation which is carried forward under the control of one of the micro-switches MS5, MS6 as will be more fully explained hereinafter. To properly correlate the operation of S5 with that of toggle switch S3, actuator finger 219 carries a screw 220 for making the contact with the switch button, screw 220 being threaded through the finger 219 for adjustment.

Reversal of fore-aft carriage movement is provided for by a toggle switch S4 (Fig. 8) which is carried by a bracket 221 mounted on member 55 of the camera head frame and is actuated by a yoke 222 carried by an actuator bar 223. Bar 223 has a lost motion pin and slot connection 224 with bracket 221, and a lost motion actuator connection with intermediate carriage 52, the latter connection comprising a slot 225 in bar 223 and a headed pin 226 which is mounted in rack bar 160 and projects through slot 225. These lost motion connections are similar to those for switch S3, and provide for reversal of switch S4 when the carriages arrive at the rearward limit of travel thereof. They also set up the circuit for rearward movement of the carriages when the latter arrive at their forward limit of travel (loading position), but a "hold" switch intervenes at this point to prevent immediate reversal at the forward limit, thus holding the carriages for removal and replacement of the film holder, as will be more fully explained hereinafter. Upon release of the "hold," the carriages will automatically move from the loading position to the rearward limit position, thus positioning the film for starting the first line of exposures.

ELECTRICAL CIRCUIT

Mask and shutter controls

Figure 10:
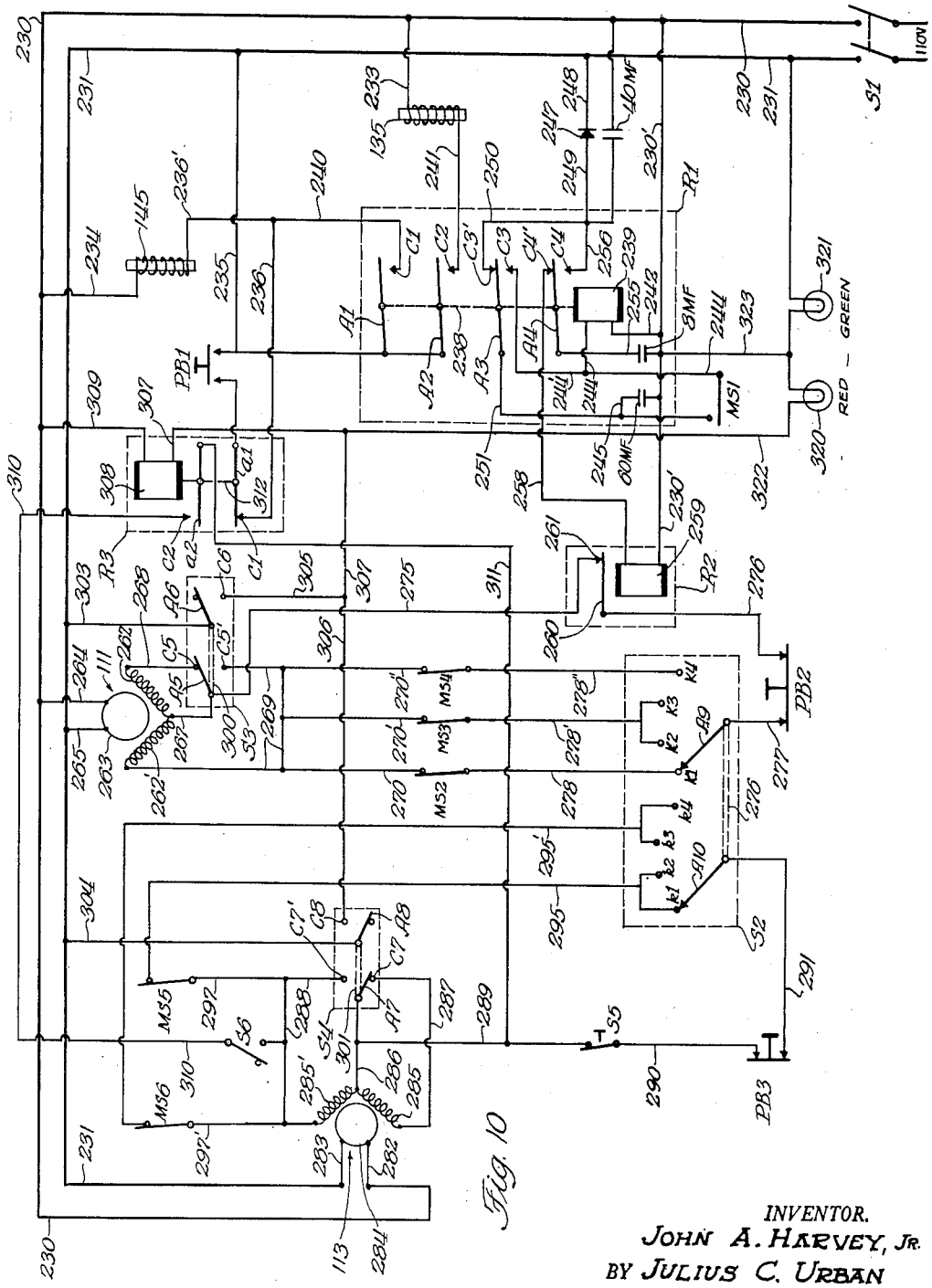
Fig. 10 is a wiring diagram of the control circuit of the apparatus.

Fig. 10, at the rightward end thereof, shows the circuit for the image framing and shutter tripping mechanism. From a source of electric power (e. g. 110 volt 60 cycle standard utility current) indicated at 110V, conductors 230 and 231 (the latter may be considered to be the "hot wire") lead off from a master switch S1 to feed the network of wiring in the camera head. Solenoids 135, 145 are connected permanently to ground by respective connections 233, 234.

A pushbutton PB1 is utilized for manually starting a step of operation. One contact thereof is connected by a conductor 235 to power lead 231. The other is connected to a movable contact a1 of a double pole, double throw relay R3, contact a1 being normally closed on a contact c1 from which a connection 236, 236' leads to solenoid 145. A normally open switch, PB1 when closed will establish the above indicated starting circuit by which solenoid 145 is energized to move the lens barrel and its associated mask upwardly into operative positions.

A relay R1 then "takes over" to continue the energizing of the solenoid 145, and in timed sequence, to energize the shutter tripping solenoid 135. R1 is a four pole doublethrow relay, embodying four simultaneously movable arms A1, A2, A3, A4, all tied to the relay armature 238 which responds to the relay coil 239. Arms A1, A2 are normally out of contact with their respective contacts C1, C2, which are connected to solenoids 145, 135 respectively by conductors 240, 241. Coil 239 has a connection 242, 230' to ground, and is initially energized by direct current derived by rectification of the alternating current through a rectifier 247 (e. g. a 100 miliampere selenium rectifier) which has a connection 248 to power lead 231 and a connection 249, 250 to upper relay contact C3' normally contacted by arm A3. From A3, a conductor 251 leads to one side of micro-switch MS1, the other side of which has a connection 244 to relay coil 239. Thus when bell crank arm 148 closes microswitch MS1, coil 239 is energized, causing relay R1 to reverse from its normal position shown in the drawing. Thereupon, arm A1 closes on contact C1, continuing the energization of solenoid 145 even though the operator releases push button PB1. Simultaneously, arm A2 closes on contact C2, energizing solenoid 135 to trip the shutter. It will now be apparent that the opening of the shutter occurs after the image framing mask has been pressed against the film.

Timing of the exposure is provided for by a holding action on coil 239, effected by discharging through the coil a previously charged condenser 60MF (the reference characters used to designate condensers herein may be taken as indicative of capacities that may be satisfactorily employed). Such condenser discharge is substituted for the connection to rectifier 247, which is broken when arm A3 leaves C3'. The condenser discharge circuit is established when arm A3 closes on alternate contact C3, the latter having a connection 244', 244 to coil 239, arm A3 having a connection 251, 245 to the condenser, and the condenser having a connection 230, 242 to coil 239. Condenser 60MF is electrically adjusted to the circuit so as to provide a delay interval of the correct length to maintain the shutter open for the correct exposure time, and to maintain the mask in engagement with the film for the same interval. At the end of the interval, the relay R1 returns to its normal setting, opening the circuits for both solenoids 145, 135 at contacts C1, C2 and initiating the traverse operation as will shortly be explained.

Charging of condenser 60MF occurs when relay R1 is at rest, and utilizes rectifier 247 and connections 248, 249, 250, C3', A3, 251, 245 and 230' from power lead 231 to ground wire 230. For smoothing out the direct current flow and voltage, a condenser 40MF is connected in parallel with rectifier 247, as shown.

Traversing controls-selector

Traversing operation is triggered by the return of relay R1 to its normal setting, in order that it may automatically follow the completion of image exposure without being allowed to start sooner. Such trigger action is provided for by the fourth pole of relay R1, and utilizes a condenser 8MF which has a connection 255 to arm A4 and a connection 230' to ground. When relay R1 is energized, arm A4 closes on contact C4 which has a connection 256, 249 to rectifier 247, completing a charging circuit through which 8MF is charged. When the exposure interval ends and arm A4 returns to its normal position engaging its alternate contact C4', there is established the traverse triggering circuit which includes a conductor 258, coil 259, of a traverse-starting relay R2 and ground connection 230' to one side of condenser 8MF, thence through connections 255, A4, completing the circuit.

Coil 259 is the energizing coil for traverse-starting relay R2, which includes a movable contact arm 260, normally closed on a contact 261. When condenser 8MF discharges, arm 260 will momentarily leave contact 261, to initiate the operation of motor 111, by momentarily opening one of the field circuits thereof. The discharge interval of condenser 8MF is of sufficient duration to cause the motor to operate to the point where the control cam of whichever of its limit switches MS2, MS3, MS4, is in control, has rotated sufficiently to lift the switch arm roller of that limit switch out of the cam notch, thus opening the limit switch so that the operation of the motor continues under the control of the limit switch. The motor and limit switch circuit may now be considered.

Horizontal traverse motor

Motor 111 is a reversible induction motor, with fields 262, 262' in either of which current may be induced from a constantly energized rotor 263 when the other field has an open circuit, but in which a bridge balance is established when both field circuits are closed, causing the motor to remain at rest. Rotor 263 is constantly energized through connections 264, 265 to the line conductors 230, 231.

Fields 262, 262' have a common connection 267 to a switch arm A5 of toggle switch S3. When A5 is closed on contact C5, which has a connection 268 to field 262, a shunt circuit to field 262 is established, through which field 262 will be energized when the circuit of field 262' is open. Field 262, when energized alone, effects rotation of the motor for return of the film holder carriage for the start of a new line.

Field 262' has three alternate circuits, each including the central connection 267 and a connection 269 to contact C5' of toggle switch S3, which is adapted to be contacted by arm A5 in its alternate position. From connection 269 there are three parallel connections 270, 270', 270'' each leading to one contact of a respective cam operated micro-switch MS2, MS3, MS4. A conductor 275 leads from toggle switch arm A5 to contact 261 of starting relay R2, and a conductor 276 leads from arm 260 of R2 to one side of a manually operable horizontal frame selector switch PB2 (a push button switch).

Selector switch

A selector switch S2 is utilized for selecting the size of the image area to be exposed, the operation of this selector switch being manually correlated with the setting of mask turret 120.

Selector switch S2 is a double pole, 4 position rotary switch, having two swinging contact arms A9 and A10 respectively, tied together by a mechanical connection 276, for unison movement. Arm A9 has a connection 277 to frame selector switch PB2. Selector S2 has contacts K1, K2, K3 and K4 for selective engagement by arm A9, K1 having a connection 278 to limit switch MS2, K2 and K3 having a common connection 278' to limit switch MS3, and K4 having a connection 278'' to limit switch MS4. Thus provision is made for three alternate limit switch controlled circuits to motor field 262', each of such circuits including starting relay R2, conductors 275, 267, 269, 277 and 276 and push button PB2, all in series. Opening the selected circuit at any one of the three points (at relay R2, at a limit switch MS2, MS3, or MS4, or at frame selector switch PB2) will break the circuit to field 262' and thereby cause current to flow in the circuit 262, 267', A5, C5, 268 of motor 111, so as to effect the horizontal traversing action of the film holder. When started at relay Ri, such transverse action will constitute a stepping interval determined by the cam operated limit switch MS2, MS3, or MS4, whichever has been selected.

For engagement by arm A10, selector switch S2 has four contacts k1, k2, k3 and k4. k1 and k2 have a common connection 295 to one side of cam operated limit switch MS5. k3 and k4 have a common connection 295' to one side of cam operated limit switch MS6. Limit switches MS5 and MS6 have parallel connections 297, 297' to the outer connection 288 of field 285' of motor 113.

Return traverse

When toggle switch S3 has been reversed from the position shown so as to bring arm A5 against contact C5', the circuit of field coil 262 will be opened so as to cause the current to flow in field 262. Simultaneously, the starting relay R2, frame selector switch PB2 and cam operated limit switches MS2, MS3, MS4 are shunted out of the circuit of field 262', a direct shunt circuit to coil 262' being established through connections 267, A5, C5' and 269.

Thus the return traverse continues uninterruptedly from the end of one line back to the beginning of a succeeding line, unaffected by the cam operation of the limit switches or by any accidental operation of manual switches PB1, PB2.

Line advancing mechanism

Line indexing motor 113 has a field 285' which, when energized alone, causes the motor to rotate in the direction to move the carriage 52 rearwardly in the camera head (e. g. from loading position back to traverse starting position) and a field 285 which when energized alone causes the motor to operate in the direction for indexing the carriage forwardly from one line of exposure to a succeeding line.

Fields 285, 285' are adapted to be inductively energized by induction from rotor 284 which has connections 283, 282 to line wires 231, 230 respectively. The two fields have a common connection 286 to a switch arm A7 of vertical reversing toggle switch S4. Contact C7 of this toggle switch has a connection 287 to field 285, and is adapted to be engaged by arm A7 to form a closed circuit with field 285. Alternate contact C7' has a connection 288 to field 285'. In parallel with common connection 286 is a conductor 289 leading to one side of the line advance switch S5. The other side of S5 has a connection 290 to one side of a manually operable vertical line selector switch PB3. The other side of PB3 has a connection 291 to the swinging arm A10 of selector switch S2. It will be apparent that, with switches S5 and PB3 in series with parallel microswitches MS5, MS6, the opening of the circuit of field 285' at switch S5, or at switch PB3, or at either of the microswitches will cause current to flow in field 285 so as to energize the motor 113 for line advancing movement, when switch 54 is in the position shown.

With toggle switch arm A7 closed on contact C7, motor 113 will commence to operate in the direction to index the film holder forwardly for a new line of exposures, when the circuit of field 285' is broken at vertical line advance switch S5. The operation of motor 113 will continue until the cam which controls the selected microswitch MS5 or MS6 has rotated sufficiently to move its coacting roller out of the cam notch, onto the cam periphery, thereby opening the selected micro-switch and continuing the operation of motor 113 until the cam has made a full rotation, dropping the roller back into the notch and allowing the selected micro-switch to close, thus reclosing the circuit to field 285', balancing the two field circuits and causing the motor to stop.

*Manual line advancing and frame selector switches*

Push buttons PB3 and PB2 are the manual line advancing and frame selector switches, respectively. The carriage may be indexed forwardly any selected number of lines, without stopping, by pressing manual push button PB3 and holding it down until the film holder has reached a selected position. Similarly, the operator may manually control the line traversing movement of the film holder to any selected position by holding down push button PB2. The number of lines of vertical indexing, or the number of unit steps of horizontal advance, may be determined by listening to the clicking sounds made by the respective cams as their rollers are engaged in the cam notches.

*Solenoid cutout relay*

Relay R3 functions as a cutout relay for rendering the push button PB1 inoperative to initiate the operation of solenoids 145, 135 during any return traverse operation of motor 111 or any operation of motor 113 to carry the film holder rearwardly from loading position to the initial exposure position. To this end, the toggle switches S3 and S4 have secondary switch arms A6 and A8 respectively, tied to switch arms A5 and A7 by respective mechanical connections 303, 301, for movement in unison herewith. Switch arms A6, A8, have connections 303, 304 respectively to power lead wire 231. Toggle switches S3, S4, have respective contacts C6, C8 which have connections 305, 306 to a common conductor 307 leading to one side of energizing coil 308 of relay R3, the other side of coil 308 having a connection 309 to ground wire 230.

When toggle switch S3 has been actuated at the end of a line of traverse movement, so as to reverse motor 111 for return traverse back to the beginning of another line, its arm A6 will have been shifted to contact C6, thus energizing cutout relay R3 and shifting arm a1 thereof away from contact c1, thus opening the circuit of pushbutton PB1 so that solenoids 145, 135 cannot be energized during such return traverse.

Similarly, when vertical reversing toggle switch S4 has been actuated, at the loading position, for return of the film holder to exposure starting position, toggle switch arm A8 will have been moved into engagement with contact C8 to energize relay R3 and break the circuit to pushbutton PB1. Thus there can be no damage to the film or masking apparatus, since the mask cannot be raised during such return traverse.

*Load holding and release mechanism*

For holding the carriage 47 at the loading position (forward left corner of camera head, in communication with loading slot 50) toggle switch S4 is arranged so that its reversal at the forward limit of carriage movement takes place at a point where both limit switches MS5 and MS6 are open, and instead of immediately establishing a circuit to field 285', for return operation, corresponding to the shunt circuit 269, A5, C5', 267 of motor 111, the reversal of toggle switch S4 partially sets up a shunt circuit for field 285' through relay R3. For this purpose, relay R3 has a second contact arm a2, engageable with a contact c2 which has a connection 310 to one side of a load hold release switch S6, the other side of which is connected to the field 285' through connection 288. Relay R3 has its contact arms a1 and a2 both tied to its armature 312, for movement in unison. Arm a2 has a connection 311, 289 to the common connection 286 of fields 285, 285', whereby, when relay R3 is energized (by reversal of toggle switch S4, closing arm A8 on contact C8) a circuit for field 285' will be established through connections 286, 289, 311, a2, c2, and 310 as far as hold release switch S6. S6 is normally open however, and consequently, motor 113, instead of immediately reversing, will stop and remain at rest, arresting the film holder at the loading position, due to the fact that the circuits for both fields 285 and 285' are now open.

To release the hold, the operator closes hold release switch S6, thus completing the circuit for energizing field 285' while the circuit of field 285 remains open between the contacts A7 and C7 of toggle switch S4, thus causing the motor to operate in a direction to move the carriage rearwardly from the loading position to the initial exposure position. During this operation, the operator must continue to manually hold switch S6 closed.

*Control box*

Referring now to Fig. 1 in conjunction with Fig. 10, it may be noted that master switch S1, cycle start push button PB1, manual frame and line selector push buttons PB2 and PB3, selector switch S2 and hold release switch S6 are incorporated in convenient positions in control box 29, for operator control. Also mounted in box 29 are red and green indicator lamps 320 and 321, the former having connections 322 and 323 to return traverse connection 307 and to ground connection 230' respectively, whereby a red warning signal is given simultaneously with energization of cutout relay R3, when a return traverse or rearward movement from loading to first exposure position is occurring. Green lamp 321, shunted directly across lines 230, 231, simply indicates that master switch S1 is closed.

OPERATION

The operation of the various units of the camera has been largely described in conjunction with the preceding description of the mechanism, in order to facilitate the understanding of the mechanism. The present description of operation will therefore constitute largely a review and correlation of what has already been explained, omitting the minute details thereof, and referring back to the same for a more complete explanation of the operation of any individual unit.

*Preparation of the camera for operation*

Let us now assume that a series of documents or other subjects are to be photographed in a selected order on a film sheet of a selected size, and that it is desired to record a maximum number of images on a sheet. If the documents do not exceed a moderate size, it may be possible to utilize the unit frame size. For the maximum size document that can be recorded in this unit frame, the camera head 24 will be adjusted upwardly to maximum distance from bed 21. If the subjects are small, it may be necessary to adjust the camera head downwardly in order to have the images of the subject fill the unit frame areas. Where the unit size is to be used, turret 120 is adjusted to bring the smallest mask 122 into alignment with the camera lens barrel, and selector switch S2 is adjusted to a corresponding position, i. e. to the number one position in which arms A9, A10 rest on contacts K1 and k1 respectively. For documents larger than those that can be recorded in the unit size frame, the turret 120 will be rotated to bring a larger framing mask 123, 124 or 125 above the camera lens. A corresponding adjustment of the selector switch to the No. 2 or No. 3 or No. 4 position (corresponding to the masks 123, 124, 125 respectively) is made.

As the camera head 24 is raised or lowered to bring it to the proper position for recording images, of the selected frame size, of the documents to be photographed, there will be an automatic focusing adjustment of the lens carrying inner barrel 130 relative to the reciprocable outer barrel 129, executed through the action of roller 173 travelling on the inclined cam bar 174, and transmitted through linkage 172—164 to the toggle links 154, 155, to vary the angular relation of the latter and thereby change the spacing between the lens barrel elevator arm 153 and the inner barrel rim 157, as previously explained.

In order to provide a guide for positioning the documents on bed 21 so as to have them centered at the optical axis of the camera, it may be desirable to indicate the outline of the document on the ruled face 43 of the bed, as by drawing an outline directly on the face of the bed with crayon or by attaching a sheet of paper to the bed with adhesive tape, to provide a location area such as that indicated at 44. The long axis of the outlined area will of course be arranged, either vertically or horizontally, to correspond with the orientation of the long axis of the image frame area that has been selected.

*Loading*

Having made the above described preparations, the film holder 25 may then be loaded with one or two films, using conventional dark room methods, and the dark slides 77, 77' inserted into the holder. The holder may then be taken to the camera, the loading door 60 released and swung downwardly to expose slot 50, and the holder inserted through the slot. It will be assumed that the holder carriage 47 is in the loading position at the left forward corner of the camera head 24, where its slideways 73 register with slot 50, so that, as the holder is inserted through the slot, the latter will guide it into the slideways 73. By inserting the tips of the fingers through slot 50, the holder may be pushed completely into the carriage 47 until it engages the rear frame member 91' thereof as indicated in Fig. 9, whereupon it will be properly located for the ensuing exposure operations. The door 60 is then raised and locked against the forward wall of hood 58 by latches 62, thus sealing the camera hood 58 against the entry of light rays. The crank 81 may then be manipulated to shift the under dark slide forwardly through light masking slit 65 sufficiently so that it can be grasped by the fingers and removed, as previously described and shown in Fig. 4.

*Load hold release*

As previously explained, at the completion of a previous cycle of operation, with the film holder carriage 47 having made a return traverse to the left side of the camera head and then indexed forwardly to a forward limit position in which both micro-switches MS5 and MS6 are standing open, and in which toggle switch S4 has been reversed so as to place contact arms A7 and A8 on contacts C7' and C8, the motor 113 will stop and remain at rest because of the circuits to both fields 285, 285' being open; but the closing of arm A8 on contact C8 will set up a circuit, through contacts a2, c2 of cut-out relay R3, as far as hold release switch S6. When the loading operation has been completed, the operator, in order to move the carriage 47 back to the initial exposure position (left rear corner of the camera head) actuates hold release switch S6 to close the circuit through connections 286, 289, 311, a2, c2, 310 and 288 to energize field 285', the circuit to field 285 remaining open. The motor will then operate, as long as switch S6 is held down, to move the carriage to the first exposure position.

*Exposure operation*

Having properly positioned the film, the operator then presses cycle starting push button PB1, closing the circuit to solenoid 145 through connections a1, c1, 236', 234 and 235 to energize solenoid 145 directly from the power line 230, 231. Solenoid 145 then operates to swing bell crank 148, 149 clockwise as viewed in Fig. 6, movement being transmitted from bell crank finger 149 to arm 152 of rocker bar 150, and from arm 153 of the rocker bar through pin 159 to outer barrel section 129 of the lens assembly, raising the lens barrel, with the upper end of barrel section 129 contacting flange 126 of the image framing mask 122, 123, 124 or 125 (whichever is positioned above the lens) and raising the mask, against the yielding resistance of spring 127, into contact with film 45 so as to frame the image to be exposed. In this operation, the action of plunger 162' in dash pot cylinder 162 will cushion and delay the upward movement of the lens barrel so as to avoid damage to the film or to the camera parts.

The engagement of the mask against the film arrests the upward movement of the lens barrel and thus exactly determines the proper position of the lens, in sharp focus, for any position of focusing adjustment of the lens relative to outer barrel section 129. The apparatus is now set for the exposure.

*Shutter trip*

After the upward movement of the lens barrel has stopped, bell crank arm 148 will have an over-travel which is permitted by the yielding connection 205—207 between finger 149 and rocker arm 150, which overtravel is utilized for engagement of micro-switch MS1 by arm 148, closing this switch to initiate the shutter tripping operation.

Closing of micro-switch MS1 operates to set up a circuit between rectifier 247 and coil 239 of relay R1 through connections 249, 250, C3', A3, 251, 244, 242 and 238', thus energizing relay R1, causing the latter to reverse from its normal position shown in Fig. 10 to the alternate position wherein its four switch arms close upon their lower contacts C1, C2, C3 and C4, leaving upper contacts C3' and C4'. Closing of arm A1 on C1 established an alternate circuit to solenoid 145 for continuing the flow of power thereto, and allows push button PB1 to be released. Closing of arm A2 on C2 establishes the circuit to solenoid 135 for energizing the same, resulting in the tripping of the shutter through linkage 137, 138, 139, of Fig. 6.

Separation of arm A3 from contact C3' takes rectifier 247 out of the circuit and shunts the condenser 60MF across coil 239 through connections 230', 242, 244, 244', C3, A3, 251 and 245, the condenser having been previously charged as the result of being in parallel with coil 239 in the circuit of rectifier 247 above described. The discharge of condenser 60MF occurs over a time interval which determines the length of exposure.

The closing of arm A4 on contact C4 establishes a charging circuit from rectifier 247 to condenser 8MF, by which this condenser is charged. At the end of the interval of discharge of condenser 60MF, the energy in coil 239 which has maintained relay R1 reversed, is dissipated and the relay returns to its normal position shown in Fig. 10.

Traverse operation

The return of arm A4 of relay R1 to contact C4' places condenser 8MF across coil 259 of traverse starting relay R2, momentarily actuating that relay to draw its arm 260 away from its normal position in engagement with contact 261, and opening one side of the balanced bridge circuit which exists in the two fields 262, 262' of traverse motor 111. At the time of this occurrence, the micro-switch (e. g. MS2) which has been selected at selector switch S2 (e. g. by the closing of arm A9 on contact K1), will be closed because of its corresponding cam follower roller having dropped into the notch of its cam (e. g. 195) in the termination of a previous step of operation. If the cam does not happen to be in this position, it will move to that position when selector A9 engages contact K1 during the selecting operation, or as soon thereafter as toggle switch S3 is adjusted to its position for image exposing traverse operation, the position shown in Fig. 10, or when master switch 232 is closed to energize the line wires 230, 231. With the circuit of field 262' broken at starting relay R2, motor 111 will rotate so as to move the film holder carriage rightwardly, and as soon as the cam follower roller has ridden out of its cam notch (condenser 8MF remaining operative up to this point) the selected micro-switch will be thereby opened, continuing the energization of the motor until the operative cam has made one complete rotation, to break the circuit at the selected micro-switch and thus complete the step of traverse to a new exposure frame area. With selector switch A9 on contact K1, this will occur at the end of one unit frame width. With selector arm A9 on contact K2 or K3, the slower moving cam 196 will open micro-switch MS3 to terminate the step at the end of a double width traverse, regardless of whether vertical indexing selector arm A10 is resting on contact $k2$ or $k3$. In the former instance, vertical indexing, line advancing movement would be of unit height, for a double area frame, and in the latter instance it would be of double height, for a quadruple area frame. With switch arm A9 on contact K4, the horizontal traverse would continue, under the control of the slowest moving cam 197, for a quadruple width traverse, with the ensuing line advancing movement, under the control of vertical indexing selector arm A10 on contact $k4$, providing for a double line advancing movement, for the maximum area frame.

With the film holder thus shifted to a new exposure position (and a new document laid on the framed area 49 of the bed 21) it is only necessary to again depress pushbutton PB1 to start another cycle of operation such as that described above, in which a new exposure is made. This will continue until the end of a line is reached, either through a complete series of stepping operations or by manual frame selection as described in the following paragraph.

Manual frame selection

Where less than a full line of images are to be exposed, the operator, when the last exposure of a line has been made, may effect a continuous horizontal traversing movement of the carriage from that point to the end of the line by depressing push button PB2, so as to directly control traversing motor 111 with the lens and shutter mechanism remaining inoperative, and with the cam operated limit switches likewise remaining inoperative (since the control side of the motor circuit remains open at PB2 regardless of any closing of a micro-switch MS2, MS3, or MS4), whereby a continuous traverse to the end of the line is effected.

Return traverse

At the end of each line of horizontal traverse, toggle switch S3 will be reversed so as to establish the shunt circuit 269, C5', A5, 267 across field 262', cutting out all other controls including micro-switches MS2, MS3, MS4, etc.; and at the same time, the circuit of field 262 will be broken by separation of arm A5 from contact C5, so as to cause current of flow in field 262', operating the motor in reverse for returning the carriage 47 to a line beginning position.

Automatic line advancing

Simultaneously with the reversal of toggle switch S3, carriage 47 will engage vertical line advance switch S5 to temporarily open the same, thus opening the circuit of field 285', the control side of the motor 113, this control circuit having, throughout the horizontal return traverse, remained closed owing to the fact that whichever one of the micro-switches MS5 and MS6 has been selected at selector switch S2, is in a closed position owing to a previous line advancing operation having terminated by the dropping of a roller of that micro-switch into the corresponding cam recess (e. g. where selector arm A10 is on contact $k1$ or $k2$, micro-switch MS5 will control the stopping of the motor when its cam roller drops into the notch of cam 182).

With the circuit of field 285' thus closed, the opening of the circuit of field 285 at vertical line advance switch S5 will cause the motor to operate for forward indexing movement of the carriage 52 until the rotation of the controlling cam 181 or 182, as the case may be, causes the corresponding roller to ride out of its recess, thus opening the corresponding micro-switch, which takes over the control of motor 113 to complete the line advancing movement until the controlling cam has made one full revolution, whereupon the controlling micro-switch will drop into the cam notch to terminate the line advance movement. In the meantime, switch S5 has reclosed after limit switch MS5 or MS6 has taken over, owing to the fact that during this vertical indexing movement, the carriage 47 is simultaneously returning leftwardly to the beginning of the new line.

Margin indexing

When the carriage has returned to its leftward limit of movement, toggle switch S3 is reversed back to its normal position shown in Fig. 10, breaking the return shunt circuit 269, C5', A5, 267 and reestablishing the energizing circuit for field 262 through connections A5, C5, 267 and 268. At the leftward limit of carriage movement, microswitches MS3 and MS4 will both be in open position. Consequently, upon reversal of toggle switch S3 back to its normal position shown in Fig. 10, the control field 262' will be deenergized and field 262 will immediately operate motor 111 to start the rightward traverse of carriage 47, indexing it to the proper position to center the double width or quadruple width image area with reference to the lens axis. For the double width area, controlled by switch MS3, this would entail a rightward margin indexing of a unit frame width so as to register the camera axis with the margin between two unit frame areas, i. e. at the center of the double width area. For a quadruple width image area, it would entail a margin indexing equivalent to two unit frame widths. A slight amount of initial frame indexing may also be provided for margin adjustment for a single unit width frame.

A similar margin indexing takes place at the end of the rearward movement of the carriage 47 from loading position to an initial exposure position, the toggle switch C4 reversing motor 113 back to its normal position shown in Fig. 10 when it reaches said rearward limit of such movement, and, if the micro-switch MS6 is in control, immediately moving forwardly a distance equivalent to the height of one unit frame, thus to center the camera axis at the center of the double height frame.

*Loading*

When all lines of images have been exposed, the carriage 47 will have moved substantially to this forward limit. At the end of the last line, however, there will be one more reversal of toggle switch S3 to return the carriage to the left side of the camera head, and one more operation of vertical line advancing switch S5 to advance the carriage sufficiently to reverse toggle switch S4, thus opening the circuit of field 285 and arresting the operation of motor 113. This operation of toggle switch S4 takes place at a point where both micro-switches MS5 and MS6 are open, so that it requires the operation of hold release push button S6 to effect the return movement of the holder back to the initial exposure position.

We claim:

1. In a micro-copy camera for recording a plurality of vertically spaced horizontal lines of micro-images on a rectangular photosensitive sheet: a camera head; a horizontal traversing carriage; a vertical indexing carriage; means mounting one of said carriages for linear movements in said camera head; means mounting the other carriage in said one carriage for linear movements at right angles to said first mentioned linear movements; a sheet holder carried by said other carriage, for supporting said sheet in an image plane to which both of said movements are parallel; a lens and shutter unit mounted in said camera head and having an optical axis normal to said image plane, said unit including an exposure shutter; a pair of electric servomotors for respectively effecting movements of the respective carriages in horizontal traversing and vertical indexing steps equivalent to the horizontal spacing of successive images in a horizontal line of images and to the vertical spacing of successive lines, respectively; an image framing mask interposed between the image plane and said lens and shutter unit and axially aligned with the latter, said mask being normally withdrawn from the image plane; means in which said lens and shutter unit is mounted for movement along said optical axis toward said image plane, said unit being engageable with said mask during such movement and operative to move the mask into image-framing engagement with said sheet; a solenoid and a connection to said unit for moving said unit toward the image plane; a manual switch for energizing said solenoid; a shutter operating solenoid; control means actuated by said connection at completion of the movement of said unit, for actuating said shutter operating solenoid; and delayed action control means, triggered by said previously mentioned control means, for energizing the servomotor which effects horizontal traverse of said carriage.

2. A camera as defined in claim 1, wherein each mask comprises a tube slidably mounted in said turret, having one end engageable with said sheet and having at its other end a radial flange resting against the adjacent end of the shutter and lens unit; and including, for each mask, a spring interposed under compression between the turret and the radial flange of the respective mask, for urging the mask to said withdrawn position.

3. A micro-copy camera as defined in claim 1, including control means automatically responsive to the arrival of said horizontal traverse carriage at a limit position, to energize the other servomotor to effect a step of vertical indexing movement of said indexing carriage to a position for a line of images immediately succeeding the line just completed.

4. A camera as defined in claim 3, wherein said servomotors are each provided with respective forward and reverse fields that are normally both energized and balanced one against the other to render the respective servomotors inoperative, and wherein the control means includes switch means for opening the circuit to one of the fields so as to render the other field operative to actuate the respective servomotor.

5. A camera as defined in claim 4, wherein said delayed action control means includes a normally closed relay, a condenser the discharge of which is operative to momentarily actuate said relay, a means for charging said condenser when said shutter operating solenoid is energized, means for discharging said condenser into said relay after said shutter operating solenoid is deenergized; and connections from said relay to the horizontal traverse servomotor for breaking the circuit to the reverse field thereof when said relay is energized, whereby to effect actuation of said horizontal traverse servomotor in the stepping traverse direction.

6. In a micro-copy camera for recording a plurality of successive micro-images in linear sequence: a casing; a shutter and lens unit carried by said casing and providing an optical axis; means in said casing for moving a photosensitive sheet in step-by-step sequence past said optical axis, in an image plane normal to said optical axis, wherein images projected through said lens and shutter unit may register on said sheet; a turret rotatably mounted in said casing; a plurality of image-framing masks carried by said turret in positions for selective registration with the optical axis, said masks having light passages for determining image areas of unit size and multiple-unit size respectively, said masks being disposed in a plane between the image plane and the adjacent end of the shutter and lens unit, said masks being normally withdrawn; the shutter and lens being shiftable axially toward the image plane and engageable with the mask which is registered with the optical axis, to move the same into image framing engagement with said sheet; and means controlled by said first mentioned control means for shifting said shutter and lens unit toward the image plane in advance of the actuation of said shutter.

7. In a micro-copy camera for recording a plurality of vertically spaced horizontal lines of micro-images on a rectangular photo-sensitive sheet: a camera head; a horizontal traversing carriage; a vertical indexing carriage; means mounting one of said carriages for linear movements in said camera head; means mounting the other carriage in said one carriage for linear movements at right angles to said first mentioned linear movements; a sheet holder carried by said other carriage, for supporting said sheet in an image plane to which both of said movements are parallel; a lens and shutter unit mounted in said camera head and having an optical axis normal to said image plane, said unit including an exposure shutter; a mask turret rotatably mounted in said camera head; a plurality of image framing masks carried by said turret in positions for selective registration with the optical axis, said masks having light passages for determining image areas of unit size and multiple-unit size respectively, being disposed in a plane between the image plane and the adjacent end of the shutter and lens unit, and being normally withdrawn from the image plane; the shutter and lens being shiftable axially toward the image plane and engageable with that mask which is registered with the optical axis, to move the same into image framing engagement with said sheet; a pair of reversible electric motors for respectively effecting movements of the respective carriages in horizontal traversing and vertical indexing steps equivalent to the horizontal spacing of successive images in a horizontal line of images and to the vertical spacing between successive lines, respectively, a plurality of limit switches for each of said motors, for arresting operation thereof at the end of a cycle of operation which is a unit cycle for one of the switches and a multiple-unit cycle for another of the switches; cams for operating the respective switches in unit cycle and multiple cycle relation respectively; a selector switch unit for selectively rendering operative a selected one of said switches; means for actuating said shutter to effect an image exposure on said sheet; control means, including the selected limit switch, responsive to a single manual control operation, to effect sequentially one actuation of said shutter and one step of horizontal traversing movement of said carriage, with succeeding actuations resulting in the progressive stepping movement of said horizontal traverse carriage to a limit position where a horizontal line of images has been completed; means controlled by said control means for shifting said shutter and lens unit toward the image plane in advance of the actuation of said shutter; and control means automatically responsive to the arrival of said horizontal traverse carriage at said limit position, to effect a step of vertical indexing movement of said indexing carriage to a position for a line of images immediately succeeding the line just completed.

8. A camera as defined in claim 7, wherein each mask comprising a tube slidably mounted in said turret, having one end engageable with said sheet and having at its other end a radial flange resting against the adjacent end of the shutter and lens unit; and including, for each mask, a spring interposed under compression between the turret and the radial flange of the respective mask, for urging the mask to said withdrawn position.

9. A camera as defined in claim 7, wherein each mask comprising a tube slidably mounted in said turret, having one end engageable with said sheet and having at its other end a radial flange resting against the adjacent end of the shutter and lens unit; and said camera including, for each mask, a spring interposed under compression between the turret and the radial flange of the respective mask, for urging the mask to said withdrawn position.

10. In a micro-copy camera for recording a plurality of vertically spaced horizontal lines of micro-images on a rectangular photo-sensitive sheet: a camera head; a horizontal traversing carriage; a vertical indexing carriage; means mounting one of said carriages for linear movements in said camera head; means mounting the other carriage in said one carriage for linear movements at right angles to said first mentioned linear movements; a sheet holder carried by said other carriage, for supporting said sheet in an image plane to which both of said movements are parallel; a lens and shutter unit mounted in said camera head and having an optical axis normal to said image plane, said unit including an exposure shutter; a pair of reversible electric motors for respectively effecting movements of the respective carriages in horizontal traversing and vertical indexing steps equivalent to the horizontal spacing of successive images in a horizontal line of images and to the vertical spacing of successive lines, respectively; limit switches for arresting operation of each of said motors, including alternative limit switches for at least one of said motors; actuators for the respective limit switches, including an actuator operative through one of said alternative switches to arrest carriage movement, at the end of a unit movement and a second actuator operative through the other of said alternative switches to arrest carriage movement at the end of a movement of multiple-unit extent; a selector switch unit for selectively rendering operative a selected one of said alternative switches; means for tripping said shutter to effect an image exposure on said sheet; control means, including the selected limit switch, responsive to a single manual control operation, to effect sequentially one operation of said shutter and one step of horizontal traversing movement of said carriage, with succeeding operations resulting in the progressive stepping movement of said horizontal traverse carriage to a limit position where a horizontal line of images has been completed; and control means automatically responsive to the arrival of said horizontal traverse carriage at said limit position to effect reversal of the horizontal traversing motor for return of said traversing carriage to a starting position for the beginning of a succeeding horizontal line of images.

11. A camera as defined in claim 10, wherein said switch actuators comprise cams having respective dwell recesses and followers riding on said cams and adapted to drop into respective cam recesses, and operatively associated with respective limit switches so as to effect motor cut-off operation thereof when lowered into a recess, said cams being driven by said motors with a timing such that the interval between registrations with a cam recess, by the follower of said multiple unit traverse actuator, is a multiple of the interval between registrations with a cam recess, by the follower of the unit movement actuator.

12. A camera as defined in claim 10 wherein there is a set of said alternative limit switches for each of the motors, and wherein said selector switch unit includes two multiple-position selector switches, one for each set of alternative switches, and a common manual actuator for setting both selector switches in matched relation to one another.

13. A camera as defined in claim 10, wherein each actuator for an alternative switch is arranged to determine the proper starting position of the carriage for any succession of traversing movements under the control of the alternative switches, adjusting said starting position so as to center the lens axis with respect to the first of the series of aggregate exposure areas corresponding to the interval of stepping movement determined by a respective alternative switch; and control means automatically responsive to arrival of the horizontal traversing carriage at the end of a line for effecting shift of the vertical indexing carriage to a new line position simultaneously with the return of the horizontal traversing carriage to a line-starting position.

14. In a micro-copy camera for recording a plurality of vertically spaced horizontal lines of micro-images on a rectangular photo-sensitive sheet: a camera head; a line traversing carriage; a line-to-line indexing carriage; means mounting one of said carriages for linear movements in said camera head; means mounting the other carriage in said one carriage for linear movements at right angles to said first mentioned linear movements; a sheet holder carried by said other carriage, for supporting said sheet in an image plane to which both of said movements are parallel; a lens and shutter unit mounted in said camera head and having an optical axis normal to said image plane, said unit including an exposure shutter; a pair of reversible electric motors for respectively effecting movement of the respective carriages in line traversing and line-to-line indexing steps equivalent to the spacing of successive images in a line of images and to the spacing between successive lines, respectively; forward and reverse energizing circuits for each of said motors, for forward operation utilized in effecting stepping carriage movements and for reverse operation utilized in effecting return carriage movements, respectively; limit switches controlling the respective forward energizing circuits for alternatively sustaining and arresting forward operation of the respective motors at predetermined limits of said traversing and indexing steps respectively; limit switch actuators driven by the respective motors, operative within predetermined periods of operation of the respective motors corresponding to the intervals between said steps, to actuate said limit switches; a reversing switch controlling both of the energizing circuits of the traversing motor, automatically responsive to arrival of the line-traversing carriage at the end of a line of its stepping movements, to render inoperative the forward energizing circuit and to render the reverse energizing circuit of said traversing motor operative continuously throughout a full return of the traversing carriage to a line beginning position; a reversing switch controlling both energizing circuits of said indexing motor, operative in one position to establish the limit switch controlled forward energizing circuit of said indexing motor for indexing stepping movements and in an alternative position to establish the reverse energizing circuit of said indexing motor for continuous operation throughout a full return movement of the indexing carriage to a starting position; and starting control means, responsive to a single manual control operation, to effect sequentially an actuation of said shutter and one step of line-traversing carriage movement, arrested by the limit switch for the horizontal traversing motor.

15. Apparatus as defined in claim 14 including control means automatically responsive to the arrival of said traversing carriage at the end of a line of stepping movements, to initiate forward stepping operation of the indexing motor and to render the limit switch of the forward energizing circuit of the indexing motor operative to continue and terminate a step of indexing movement of the carriages for the beginning of a new line of images.

16. Apparatus as defined in claim 15, wherein said last mentioned limit switch is arranged to leave said forward energizing circuit of the indexing motor in an inoperative condition at return of the traversing carriage from the end of the last line of traversing movement, whereby to hold the carriages in loading position; and including a hold-release switch manually operable, after loading, to initiate the return of the indexing carriage under the control of said indexing motor reversing switch when in its reversing position, to its starting position for a new sheet of images.

17. In a micro-copy camera for recording a plurality of vertically spaced horizontal lines of micro-images on a rectangular photo-sensitive sheet: a camera head; a line traversing carriage; a line-to-line indexing carriage; means mounting one of said carriages for linear movements in said camera head; means mounting the other carriage in said one carriage for linear movements at right angles to said first mentioned linear movements; a sheet holder carried by said other carriage, for supporting said sheet in an image plane to which both of said movements are parallel; a lens and shutter unit mounted in said camera head and having an optical axis normal to said image plane, said unit including an exposure shutter; a pair of reversible electric motors for respectively effecting movements of the respective carriage in line traversing and line-to-line indexing steps equivalent to the spacing of successive images in a line of images and to the spacing between successive lines, respectively; forward and reverse energizing circuits for each of said motors, for forward operation utilized in effecting stepping carriage movements and for reverse operation utilized in effecting return carriage movements, respectively; limit switches controlling the respective forward energizing circuits for alternatively sustaining and arresting forward operation of the respective motors at predetermined limits of said traversing and indexing steps respectively; limit switch actuators driven by the respective motors, operative within predetermined periods of operation of the respective motors corresponding to the intervals between said steps, to actuate said limit switches; a reversing switch controlling both of the energizing circuits of the traversing motor, automatically responsive to arrival of the line-traversing carriage at the end of a line of its stepping movements, to render inoperative the forward energizing circuit and to render the reverse energizing circuit of said traversing motor operative continuously throughout a full return of the traversing carriage to a line beginning position; switch means for establishing one of the energizing circuits of said indexing motor while rendering the other inoperative, said switch means including means effective to maintain the reverse energizing circuit of said indexing motor effective for continuous operation throughout a full return movement of the indexing carriage to a starting position; and starting control means, responsive to a single manual control operation, to effect sequentially an actuation of said shutter and one step of line-traversing carriage movement, arrested by the limit switch for the horizontal traversing motor.

18. In a micro-copy camera for recording a plurality of vertically spaced horizontal lines of micro-images on a rectangular photo-sensitive sheet: a camera head; a line traversing carriage; a line-to-line indexing carriage; means mounting one of said carriages for linear movements in said camera head; means mounting the other carriage in said one carriage for linear movements at right angles to said first mentioned linear movements; a sheet holder carried by said other carriage, for supporting said sheet in an image plane to which both of said movements are parallel; a lens and shutter unit mounted in said camera head and having an optical axis normal to said image plane, said unit including an exposure shutter; a pair of reversible electric motors for respectively effecting movements of the respective carriages in line traversing and line-to-line indexing steps equivalent to the spacing of successive images in a line of images and to the spacing between successive lines respectively; each of said motors having, for effecting traverse stepping movements and return movement of the traversing carriage respectively, forward and reverse operation field circuits inductively responsive to a constantly energized armature and bridge-balanced so as to be both deenergized when both circuits are closed, whereby the opening of one of said field circuits wil effect the energization of the other, so that each of said circuits constitutes a control circuit for the other, said reverse operation circuits each including a plurality of branch circuits each alternatively effective to maintain the respective reverse operation circuit closed for rendering the corresponding forward operation circuit inoperative; normally closed limit switches each disposed in a first branch of a respective reverse operation circuit for traversing and indexing control respectively; actuators for said limit switches, driven by the respective motors, for maintaining said limit switches open during respective predetermined intervals of stepping operations for sustaining motor operation during said intervals, and releasing the said limit switches for reclosing movements for terminating the respective steps of operation at the ends of said intervals; a two position reversing switch for said traversing motor operative in one position to open a second branch of the reverse operation circuit of said traversing motor for control by the limit switch thereof and to close the corresponding forward operation circuit for a step of traversing motor operation, and operative in an alternative position to close the reverse operation circuit of said traversing motor and to open the forward operation circuit thereof for continued energization of the respective reverse operation circuit throughout a return of the traversing carriage to a line starting position; and manually controlled starting means including a normally closed starting switch in series relation with the traversing control limit switch in the branch circuit thereof, for momentarily opening the reverse operation circuit of said traversing motor and thereby effecting energization of the forward operation circuit thereof until said traversing control limit switch is opened so as to continue said energization to the end of a traversing step.

19. A camera as defined in claim 18, including a carriage-return switch in a second branch of the reverse operation circuit of said indexing motor, operable in response to arrival of the traversing carriage at the end of a line of stepping movements, to momentarily open said second branch circuit and thereby effect the energization of the forward operating circuit of said indexing motor until the corresponding limit switch opens to continue said energization.

20. In a micro-copy camera for recording a succession of micro-images on a photosensitive sheet; a camera head: a traversing carriage mounted for stepping movements in a linear path in said head and having means for supporting said sheet in an image plane parallel to said path; a lens and shutter unit mounted in said camera head with its optical axis normal to said plane, for movement along said axis, and including an exposure shutter; a reversible electrical motor for effecting traversing movement of said carriage in steps equivalent to the horizontal spacing of successive images on said sheet; said motor having, for effecting traverse stepping movements and return movement of the traversing carriage respectively, forward and reverse operation field circuits inductively responsive to a constantly energized armature and bridge-balanced so as to be both deenergized when both circuits are closed, whereby the opening of one of said field circuits will effect the energization of the other, so that each of said circuits constitutes a control circuit for the other, said reverse operation circuit including a plurality of branch circuits each alternatively effective to maintain said reverse operation circuit closed for rendering the forward operation circuit inoperative; a normally closed limit switch disposed in a first one of said branch circuits; an actuator for said limit switch, driven by said motor, for maintaining said limit switch open during a predetermined interval of stepping operation for sustaining motor operation during said interval, and releasing the said limit switch for reclosing movement for terminating said step of operation at the end of said interval; a two-position reversing switch for said traversing motor operative in one position to open a second branch of said reverse operation circuit for control by the limit switch thereof and to close the forward operation circuit for a step of traversing motor operation, and operative in an alternative position to close said reverse operation circuit and to open said forward operation circuit for continued energization of the reverse operation circuit throughout a return of the traversing carriage to a line starting position; and manually controlled starting means including a normally closed starting switch in series relation with the traversing control limit switch in said first branch circuit, for momentarily opening the reverse operation circuit and operating the same until said limit switch is opened so as to continue the traversing operation.

21. Apparatus as defined in claim 20, wherein said manually controlled starting means includes a double-throw delayed action relay, a manual switch for effecting initial energization of said relay to cause it to shift to an alternative position, means controlled by said relay in said alternative position to trip said shutter, and means controlled by said relay upon return to a normal position to momentarily open said starting switch.

22. A camera as defined in claim 21, including an image framing mask interposed between the image plane and said lens and shutter unit, axially aligned with the latter, and normally withdrawn from the image plane; means in which said lens and shutter unit is mounted for advancing movement along said optical axis toward said image plane, said unit being engageable with said mask during such movement and operative to move the mask into image framing engagement with said sheet; an electrical actuator connected to said lens and shutter unit for effecting said advancing movement; means directly responsive to said manual switch for initially energizing said electrical actuator; and a holding circuit for said electrical actuator, closed by said relay when in said alternative position, for maintaining said electrical actuator energized during shutter tripping and starting of the traversing operation.

23. Apparatus as defined in claim 20, wherein said manually controlled starting means includes a double-throw delayed action relay, a manual switch for effecting initial energization of said relay to cause it to shift to an alternative position, means controlled by said relay in said alternative position to trip said shutter, and means controlled by said relay upon return to a normal position to momentarily open said starting switch; said relay including a condenser to delay its return to normal position after opening of said manual switch; and means controlled by said relay in its normal position for charging said condenser.

24. In a micro-copy camera for recording a plurality of vertically spaced horizontal lines of micro-images on a rectangular photo-sensitive sheet: a camera head; a line traversing carriage; a line-to-line indexing carriage; means mounting one of said carriages for linear movements in said camera head; means mounting the other carriage in said one carriage for linear movements at right angles to said first mentioned linear movements; a sheet holder carried by said other carriage, for supporting said sheet in an image plane to which both of said movements are parallel; a lens and shutter unit mounted in said camera head and having an optical axis normal to said image plane, said unit including an exposure shutter; a pair of reversible electric motors for respectively effecting movements of the respective carriages in line traversing and line-to-line indexing steps equivalent to the spacing of successive images in a line of images and to the spacing between successive lines, respectively; forward and reverse energizing circuits for each of said motors, for forward operation utilized in effecting stepping carriage movements and for reverse operation utilized in effecting return carriage movements, respectively, limit switches operative for interrupting the respective forward energizing circuits and thereby arresting forward operation of the respective motors at the predetermined limits of said traversing and indexing steps respectively; means operating in controlled relation to advancing movements of the respective carriages for actuating said limit switches; a reversing switch controlling both of the energizing circuits of the traversing motor, automatically responsive to arrival of the line-traversing carriage at the end of a line of its stepping movements, to render inoperative the forward energizing circuit and to render the reverse energizing circuit of said traversing motor operative continuously throughout a full return of the traversing carriage to a line beginning position; a reversing switch controlling both energizing circuits of said indexing motor, operative in one position to establish the limit switch controlled forward energizing circuit of said indexing motor for indexing stepping movements and in an alternative position to establish the reverse energizing circuit of said indexing motor for continuous operation throughout a full return movement of the indexing carriage to a starting position; and starting control means, responsive to a single manual control operation, to effect sequentially an actuation of said shutter and one step of line-traversing carriage movement, arrested by the limit switch for the horizontal traversing motor.

References Cited in the file of this patent

UNITED STATES PATENTS

| | | |
|---|---|---|
| 1,298,282 | Bettini | Mar. 25, 1919 |
| 1,662,304 | Doogood | Mar. 13, 1928 |
| 1,986,693 | Uher | Jan. 1, 1935 |
| 1,991,578 | Rixen | Feb. 19, 1935 |
| 2,140,602 | Simjian | Dec. 20, 1938 |
| 2,158,039 | Wenczlar | May 9, 1939 |
| 2,369,981 | Reyniers | Feb. 20, 1945 |
| 2,535,297 | Larsson | Dec. 26, 1950 |
| 2,573,278 | Rowe | Oct. 30, 1951 |